US007188082B2

(12) United States Patent
Keane et al.

(10) Patent No.: US 7,188,082 B2
(45) Date of Patent: Mar. 6, 2007

(54) ELECTRONIC ORDERING SYSTEM, SUCH AS FOR USE BY EYE CARE PROFESSIONALS

(75) Inventors: Gordon Keane, Portland, OR (US); Douglas S. Hagen, Portland, OR (US)

(73) Assignee: Digital Vision, Inc., Portland, OR (US)

( * ) Notice: Subject to any disclaimer, the term of this patent is extended or adjusted under 35 U.S.C. 154(b) by 500 days.

(21) Appl. No.: 10/483,113

(22) PCT Filed: Jul. 8, 2002

(86) PCT No.: PCT/US02/21610

§ 371 (c)(1),
(2), (4) Date: Jan. 5, 2004

(87) PCT Pub. No.: WO03/005170

PCT Pub. Date: Jan. 16, 2003

(65) Prior Publication Data

US 2004/0215525 A1    Oct. 28, 2004

Related U.S. Application Data

(60) Provisional application No. 60/303,361, filed on Jul. 6, 2001, provisional application No. 60/364,744, filed on Mar. 15, 2002.

(51) Int. Cl.
   *G06F 17/30*     (2006.01)
(52) U.S. Cl. .......................................... 705/27; 705/26

(58) Field of Classification Search ................ 705/26, 705/27
See application file for complete search history.

(56) References Cited

U.S. PATENT DOCUMENTS

| 4,958,280 | A |   | 9/1990 | Pauly |
| 5,485,399 | A |   | 1/1996 | Saigo |
| 5,983,201 | A | * | 11/1999 | Fay .............................. 705/27 |
| 6,058,373 | A |   | 5/2000 | Blinn |
| 6,508,553 | B2 | * | 1/2003 | Gao et al. .................... 351/227 |
| 7,054,836 | B2 | * | 5/2006 | Christensen et al. .......... 705/26 |
| 2002/0143653 | A1 | * | 10/2002 | DiLena et al. ................ 705/26 |

FOREIGN PATENT DOCUMENTS

JP    2002-133219    *    5/2002

OTHER PUBLICATIONS

PR Newswire, PlanetRx.com shows vision by adding contact lenses and eye care products to product mix, dated: Jan. 19, 2000.*

* cited by examiner

*Primary Examiner*—Mark Fadok
(74) *Attorney, Agent, or Firm*—Perkins Coie LLP

(57) ABSTRACT

A system and method for ordering products, such as lens products from lens vendors, includes an intuitive interface. One or more displayable lists of options are provided to an operator, whereby selecting one item from the list decreases subsequent choices from other lists to only valid or available choices. Application tools interface with the system to permit data from external equipment to be input and associated with an order.

27 Claims, 36 Drawing Sheets

| Web# | Name |
|---|---|
| 1246 | Smitty |
| 1280 | Lundberg Account |
| 1 | DVI Administration |
| 3105 | Dr. Thompson |

Account Maintenance

Set Default | Add | Modify | Delete | OK

Lab Maintenance

2702

| Web# | Name |
|------|------|
| 1278 | Sutherlin Optical |
| 1250 | Pech Optical |
| 1251 | Walman - MIS Department |
| 1260 | Walman - Mpls Rx Lab |
| 1305 | Central States Optical |
| 1308 | DVI Test Lab |
| 1713 | Katz & Klein |
| 3102 | Sample Vision |
| 1331 | Carl Zeiss of Canada |

Member Accts | Set Default | Add | Modify | Delete

| Rx#/Patient | Account/Lab | Status | LabInv | Ent/Shp |
|---|---|---|---|---|
| 321 fred | Smitty Sample Vision | I T source 1246 not | | 03/06 |
| uncu keane georgia | Lundberg Account Sutherlin Optical | I T zeiss coating | 473631 | 03/13 Web#69802 |
| 1 test | Smitty | I T initiated | 592912 | 12/15 Web#807984 |
| 987 beebe | Smitty | I T canceled | 109426 | 09/28 Web#393 |
| 1234 bahrman tom | Smitty | I T shipped | 261284 | 09/28 Web#658 |
| 5656 frog | Smitty DVI Test Lab | I T snooglergle | 108455 | 08/17 Web#357 |
| 8787 fred | Smitty | I T initiated | 519153 | 08/17 Web#23083 |

6 base as per mike 3.14

FIG. 32

ELECTRONIC ORDERING SYSTEM, SUCH AS FOR USE BY EYE CARE PROFESSIONALS

CROSS-REFERENCE TO RELATED APPLICATIONS

This application relates to U.S. Provisional Patent Applications, Nos. 60/303,361, filed Jul. 6, 2001, and 60/364,744, filed Mar. 15, 2002.

TECHNICAL FIELD

This disclosure relates generally to computer systems and methods for remotely communicating complex orders to third parties, such as eye wear prescriptions to manufacturers or lens processing labs.

BACKGROUND

Eyeglass prescription orders are typically accomplished by filling out a form that requires completing an average minimum of 20 discrete blanks or fields and may have up to 75 fields or more depending on the special requirements of the order. The information contained in an eyeglass prescription order can be classified into the following several groups.

The actual prescription—A patient's refractive powers.

Patient information—Name, plus the measurements of the patient's eyes horizontally and vertically with respect to the patient's chosen frame.

The Frame—Since most frame companies sell directly to Eye Care Professionals (ECPs), the frame is frequently enclosed with the prescription ("Rx") or sent later to an optical lab to process lenses for the frame. The frame must be described on the order, even if not supplied, because the lab must be able to identify customer frames if separated from the lenses in the lens production process.

A frequent problem in ordering or writing a description of an enclosed frame is encountered when entering a color, eye size, or bridge size that are not available for that particular frame. In other words, each piece of information taken separately is reasonable and valid, but taken together does not describe a product or frame that exists or is available from that particular laboratory.

Lens Product—There are hundreds of different types of lens styles, each that may come in different materials (glass, plastic, etc.), and where each material may come in different colors, coatings, and power combinations. A frequent error in eyeglass prescription ordering is specifying an unavailable lens product. That is, each separate piece of information of the lens order is valid, but taken together describes a product or lens that either is not made or is not available from the laboratory that received the order.

Lens services—There are a variety of lab-supplied services that can be added to a lens product as described above. For example, labs often provide coatings for scratch resistance, anti-reflection, mirror-reflection, or colors. Again, ECPs make mistakes when ordering because of unavailability or incompatibility with certain lens products. For example, the coating ordered may exist, but be inappropriate for a chosen lens product.

Another type of lens service provided by labs relates to edging processes (shaping for insertion into frames). A lens may be polished on the edge or ordered to a specific thickness. Again, errors in ordering occur because certain finishing features may not be available for the particular lens/frame combination selected.

All the various components of an eyeglass prescription order may indeed make sense when viewed independently, but there is an error rate of more than 25% associated with handling orders that results from incompatibility in the "inter-relationships" between the items on the order.

An eyeglass prescription order is typically completed and sent to a lab in one of two forms. The first, traditional method is to fill out blanks in a paper form, and mail or fax that form to the lab. More recently, an electronic system has been developed to permit a user (such as an optometrist, technician or other individual working with a patient) to complete an eyeglass prescription using a computer and specialized software. Such software is available from, for example, Digital Vision Inc. of Portland, Oreg.

Two types of computer or entry systems have been provided. A first, traditional computer entry system used a "prompt" style of entry. A system using this type of entry would "prompt" the user or operator to enter a lens name. Then after validating that piece, the system would ask for a material, and so on. If at some point in the "prompting" sequence the operator input is rejected for whatever reason, the operator is faced with starting over again with the whole process. This type of entry has been very unpopular in eyeglass prescription ordering because it is so time consuming and because it precipitates frequent "starting over" when errors occur.

A second form of computer entry for eyewear prescription orders employs a full screen display of fields. In this system, the user sees all, or a large subset of all, fields to be completed. Full screen form entry has been more popular because of the speed and clarity of the ordering process. The form is similar to the written form that all ECPs use in their own practices.

Figure 1A:
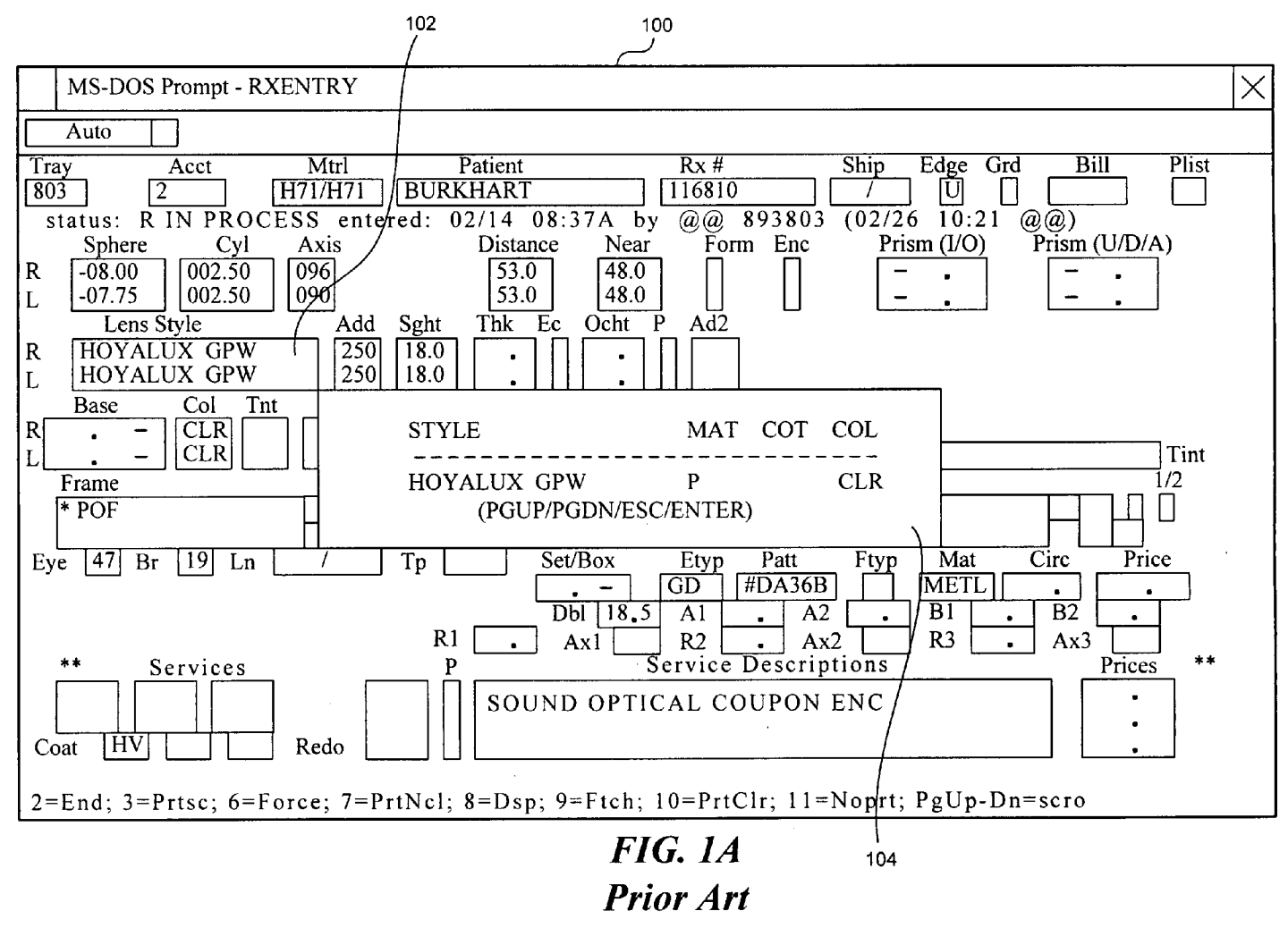
Figure 1B:
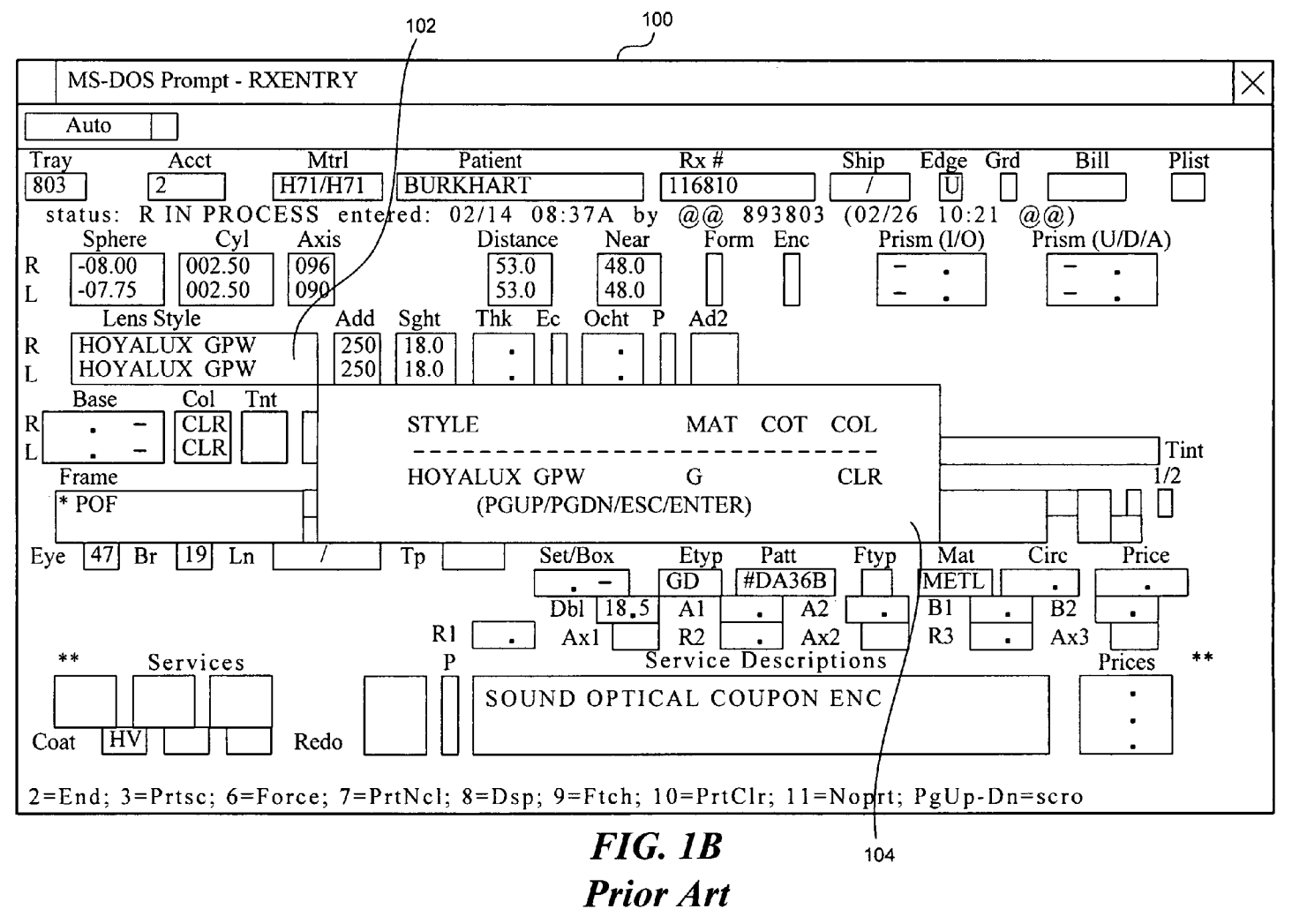

FIGS. 1A and 1B show an example of such a prior art order entry system. Udder this example, a user may enter a lens style in a lens style field 102 (such as tab or use page up/page down buttons through the form to select the appropriate field). The user may enter an "Alt-B" keystroke combination to cause a pop-up box 104 to be displayed which provides available choices of material, coatings and color. By using the page up or page down keys on a keyboard, the user can selectively display one of several individual choices, and select a desired choice by pressing the enter key (or the escape key to escape out of the window 104). Within the box 104, shown only are those specific combinations of lens style, material, color and coating that are available. For example, as shown, a user in this example has selected a particular style, and then may use the alt page up/page down keys to view materials available for the specified style (in this case glass "G" and plastic "P"). The user could also select a particular material, and then use the page up/page down keys to view styles available for the specified material. Only a single combination is shown at a time within the box 104.

Under such prior systems, a third of all orders placed with labs required a callback by the lab to clarify the order. For example, a prescription submitted to the lab may request green plastic lenses. However, that lab does not provide green plastic lenses and would then need to confirm with the ECP who placed the order whether the ECP wished to have clear plastic lenses or green glass lenses.

Other method's of automating portions of the eye care process have been undertaken, such as that described in U.S. Pat. No. 5,485,399. Further, some recent software systems for use with lens labs have or will likely become available, such as from the following: omics (www.omics.com), cc systems (www.opticalonline.com), optifacts (www.optifacts.com), optivision (optivisioninc.com), and vision star (visionstarllc.com). Some web-based systems have or will likely become available, such as from the following: vision web (www.visionweb.com), eyefinity (www.eyefinity.com), and e-lens (www.uncuts.com).

BRIEF DESCRIPTION OF THE DRAWINGS

FIGS. 1A and 1B are computer screen shots showing examples of prior art order entry screens.

FIG. 4A is a computer screen shot showing a series of cascading menus for selecting an "Aspheric SV" lens, thus permitting a user to quickly complete the form of FIG. 3.

FIG. 16 is a computer screen shot showing a series of menus for selecting a type of frame under another program choice.

FIG. 26 is a computer screen shot of an account maintenance screen.

FIG. 27 is a computer screen shot of a lab maintenance screen.

FIG. 29 is a computer screen shot of an order inquiry screen.

FIG. 32 is a computer screen shot of an alternative order entry screen.

The headings provided herein are for convenience only and do not necessarily affect the scope or meaning of the claimed invention.

Figure 11:
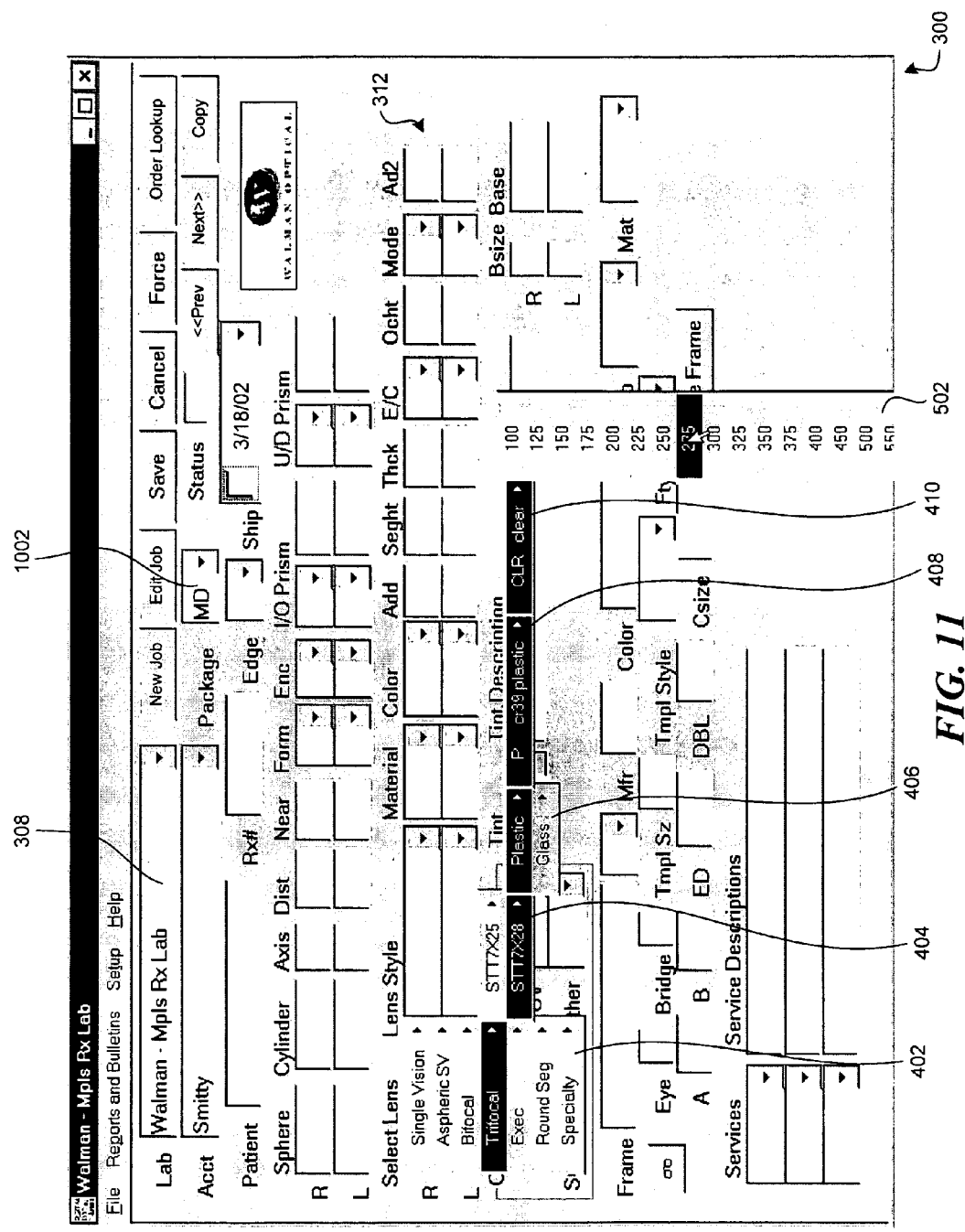
FIG. 11 is a computer screen shot showing a series of cascading menu options available when a user selects one of the program choices under the screen of FIG. 10.

In the drawings, the same reference numbers identify identical or substantially similar elements or acts. To easily identify the discussion of any particular element or act, the most significant digit or digits in a reference number refer to the Figure number in which that element is first introduced (e.g., element 1104 is first introduced and discussed with respect to FIG. 11).

DETAILED DESCRIPTION

As described herein, a method is provided for efficiently entering a product order, such as an order for lenses or eyewear. A stand-alone computer, or a computer connected to a network, presents to a user or operator an electronic order form into which the user inputs data for the particular order. Importantly, a database associated with the computer stores available combinations for a particular manufacturer or lab, thus preventing the user from ordering a combination of products or services that are unavailable from the particular manufacturer or lab selected. Further, a series of menus provide a quick and intuitive user input method for completing the form.

In one embodiment described below, a series of cascading menus present lens ordering options to users or operators. As operators make their lens selections, the next connected window only shows products and services available for the item just selected. The menus are structured so that the operator cannot make a selection that leads to a dead-end, and the result (final selection) causes the data (all selected items) to be entered on the form. This keeps the entire order visible to the operator and speeds the process. The process is especially efficient because the products may be portrayed with the most commonly used (for that laboratory) or preferred items first. So a typical "connection" or selection is accomplished by moving across the screen horizontally as in the following examples, thereby making data entry a very quick procedure. This process is accomplished visibly through the connected "cascading menu" entry and supported "invisibly" by a file structure for each laboratory, to thereby ensure correct ordering of lens product, service frame product and special marketing programs.

While the process may be performed on a single, stand-alone computer, an alternative embodiment employs a series of networked computers to provide additional advantages. For example, a computer at an ECP's office may be connected to the Internet, so that an operator placing an order may electronically transmit the completed order form to a desired lab via the Internet. Furthermore, a lab, or a server operated by a third party maintaining software to permit the order entry process, may manipulate or update the database by, e.g., identifying valid linked combinations of products or providing software upgrades. Through the Internet, this server computer communicates with computers at the labs, manufacturing locations, ECP offices, etc. Thus, the server computer, in one alternative embodiment, may act as a web server that serves up web pages to the various computers to permit order entry by ECPs or operators, and order placement to labs, using a worldwide web interface.

In a broad sense, aspects of the invention embody a computer-implemented method for ordering products between a user computer and a vendor computer over a geographically distributed telecommunications network. The method includes: providing an order entry screen, including a menu select option; providing at least a first product menu in response to receiving input selecting the menu select option, wherein the first product menu simultaneously provides a list of product styles; providing at least a second product menu in response to receiving input selecting a desired product style from the first product menu, wherein the second product menu simultaneously provides a list of materials available based on the selected product style; receiving input selecting a desired product material; and providing an electronic order, wherein the electronic order includes the selected product style and material.

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention.

Figure 2A:
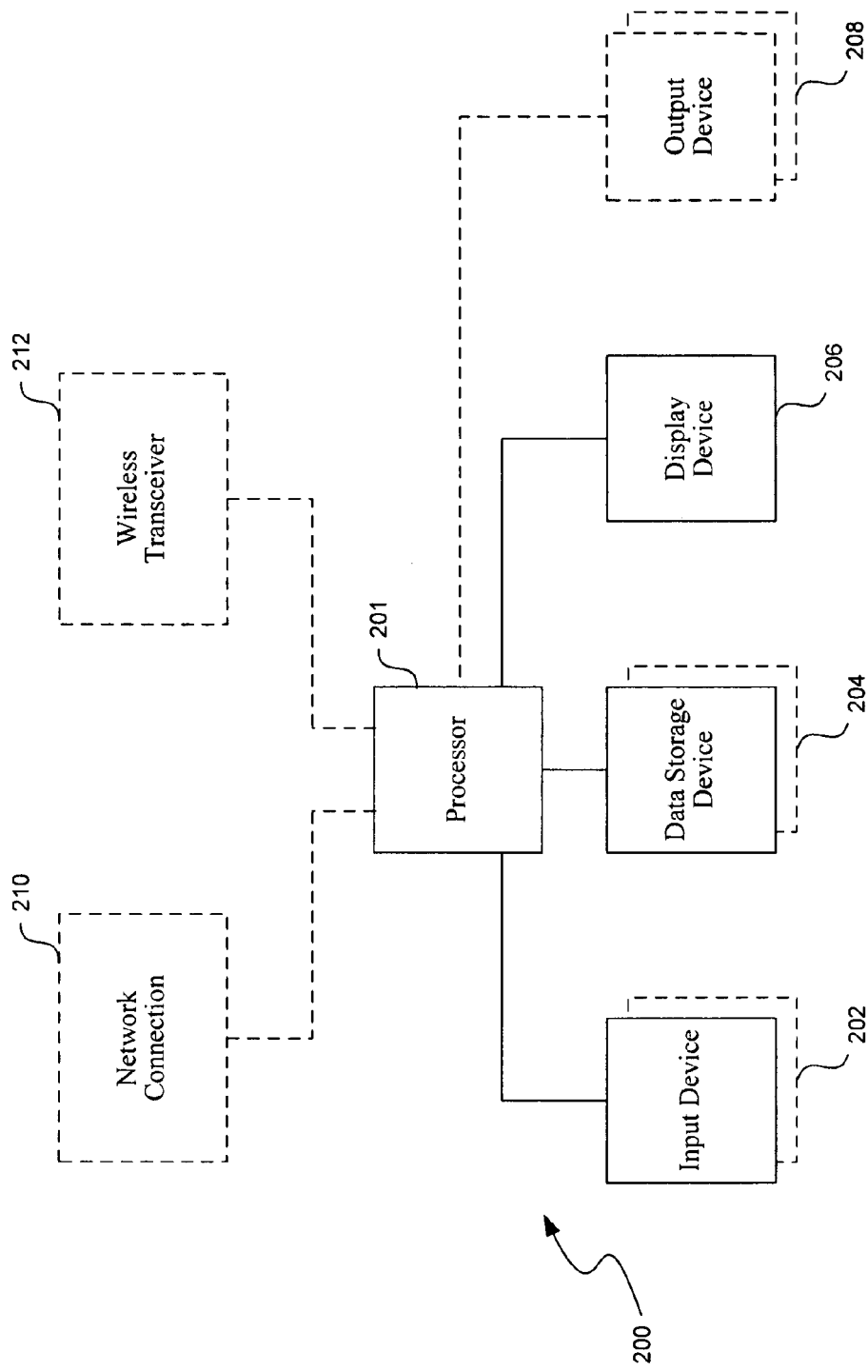
FIG. 2A is a block diagram of a suitable computer four employing aspects of the invention.
Figure 2B:
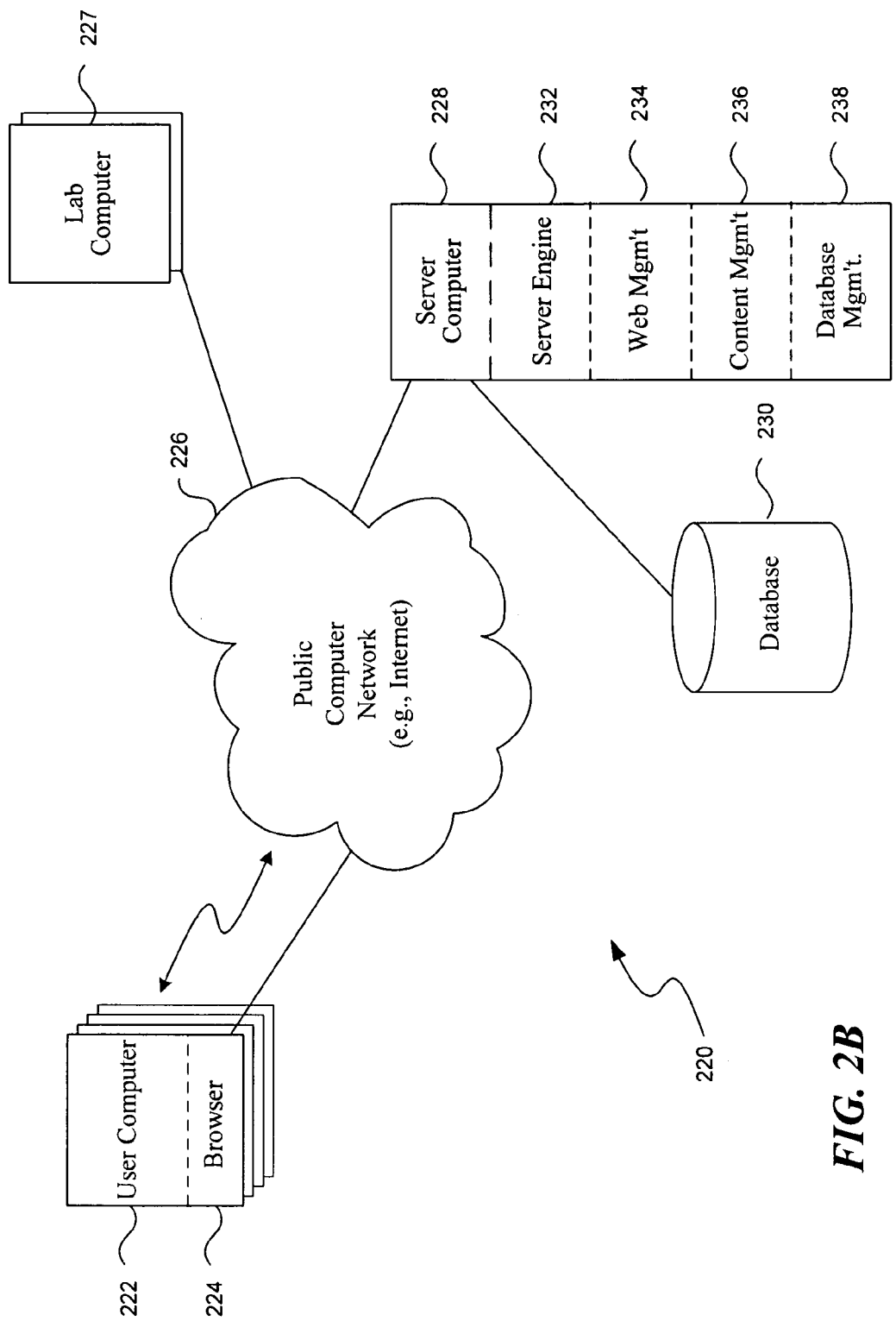
FIG. 2B is a block diagram illustrating a suitable system in which aspects of the invention may operate in a networked computer environment.
Figure 2C:
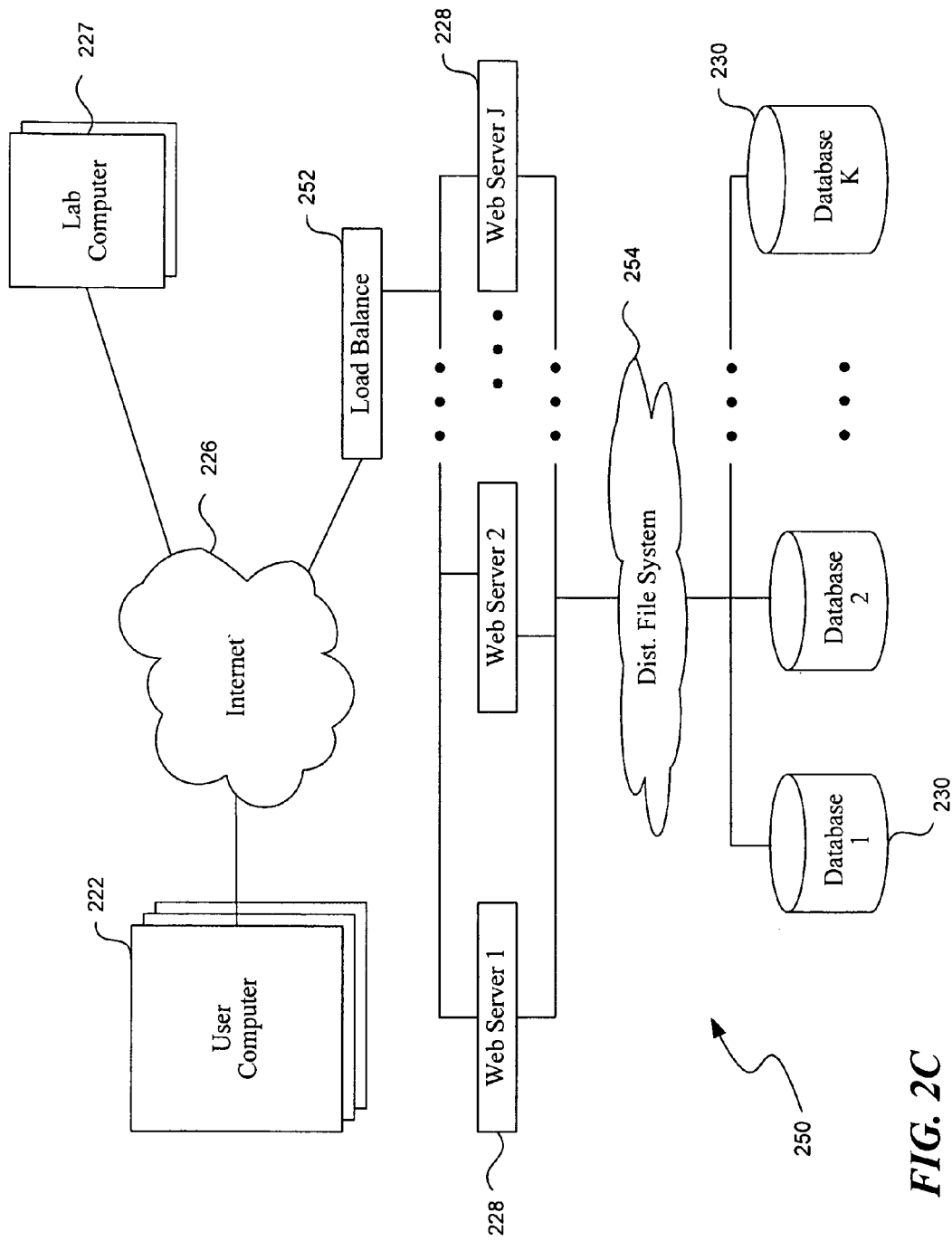
FIG. 2C is a block diagram illustrating an alternative system to that of FIG. 2A.

FIGS. 2A–2C and the following discussion provide a brief, general description of suitable computing environments in which aspects of the invention can be implemented. Although not required, aspects and embodiments of the invention will be described in the general context of computer-executable instructions, such as routines executed by a general purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a dial-up connection or communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 2A, one embodiment of the invention employs a computer 200, such as a personal computer or workstation, having one or more processors 201 coupled to one or more user input devices 202 and data storage devices 204. The computer is also coupled to at least one output device such as a display device 206 and one or more optional additional output devices 208 (e.g., printer, plotter, speakers, tactile or olfactory output devices, etc.). The computer may be coupled to external computers, such as via an optional network connection 210 (e.g., a modem or network interface card), a wireless transceiver 212, or both.

The input devices 202 may include a keyboard and/or a pointing device such as a mouse. Other input devices are possible such as a microphone, joystick, pen, game pad, scanner, digital camera, video camera, and the like. Importantly, one input device may be a frame tracer or digitizing tablet for inputting to the computer 200 data reflecting a lens geometry associated with a particular eyeglass frame. Examples include the Tracer, manufactured by HOYA of Tokyo, Japan, WECO of Dusseldorf, Germany, or the DVI GeoTrace ("GT") tablet, available from Digital Vision, Inc. of Portland, Oreg.

The data storage devices 204 may include any type of computer-readable media that can store data accessible by the computer 200, such as magnetic hard and floppy disk drives, optical disk drives, magnetic cassettes tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 2A).

Aspects of the invention may be practiced in a variety of other computing environments. Referring to FIG. 2B, the computer 200 (shown in FIG. 2B as user computer 2222) is coupled to one or more lab computers 227 by way of a network 226. In this first example, the network 226 is the public switch telephone network (PSTN), and the user and lab computers 222 and 227 exchange communications by way of modems.

In a second example, a distributed computing environment with a web interface includes one or more user computers 222 in a system 220, each of which includes a browser program module 224 that permits the computer to access and exchange data with the Internet 226, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives), such as described above with respect to FIG. 2A. User computers may include other program modules such as an operating system, one or more application programs (e.g., order entry applications [if performed locally], word processing or spread sheet applications), and the like. The user computers 222 include wireless computers, such as mobile phones, personal digital assistants (PDA's), palm-top computers, etc., which communicate with the Internet via a wireless link.

The one or more lab computers 227 communicate with the user computer 2222 directly over the Internet or via a server computer 2228. The lab computers 227 may be associated with any manufacturer or service provider with which the user computer places an electronic order for specialized goods, services. The at least one server computer 2228, coupled to the Internet or World Wide Web ("Web") 226, performs much or all of the functions for receiving, routing and storing of electronic messages, such as web pages, audio signals, electronic images, or electronic forms. While the Internet is shown, a private network, such as an intranet may likewise be used herein. The computer 2228 hosts a web site, such as "http://www.DVIRx.com," which the user computers 222 access via their browser modules 224.

A database 230, coupled to the server computer, stores much of the web pages and content exchanged between the user computers. In the depicted embodiment, the database 230 stores all data regarding each lab using the electronic order entry system, and all valid combinations of products that an operator may order. The database 230 may have a "prescription in process" database representing all orders produced by the user computers 222 and executed on by the lab computers 227, as well as current executable program updates for order entry, current lab product selections provided by labs running the lab computers, and job status databases provided by the lab computers that reflect current status of pending orders or "jobs" (all described below). In an alternative embodiment, much of this data also is stored on the client computers.

In the depicted embodiment, the database 230 stores all data regarding each lab using the electronic order entry system, and all valid combinations of products that an operator may order. In an alternative embodiment, much of this data is additionally or alternately stored on the client computers. The server computer, including the database, may employ security measures to inhibit malicious attacks on the system, and to preserve integrity of the messages and data stored therein (e.g., firewall systems, secure socket layers (SSL) password protection schemes, encryption, and the like).

The server computer 2228 includes a server engine 232, a web page management component 234, a content management component 236 and a database management component 238. The server engine performs basic processing and operating system level tasks. The web page management component handles creation and display or routing of web pages. Users may access the server computer by means of a URL associated therewith. The content management component handles most of the functions in the embodiments described herein. The database management component includes storage and retrieval tasks with respect to the database, queries to the database, and storage of data such as electronic forms completed by an operator that are to be, or have been, transmitted to a lab.

In one embodiment the client computer locally stores the order in an associated database, and the order entry application directly transmits completed order forms to a lab computer. Thus, the user computer stores locally all electronic orders. Under an alternative embodiment, an operator at the user computer 222 transmits a completed form first to the server computer 228, which in turn then routes the completed form to the appropriate lab computer 227. In this alternative embodiment, the server computer may perform an additional check on the order before sending it to the lab, and retain copies of the order for future reference by the operator.

Referring to FIG. 2C, an alternative embodiment to the system 220 is shown as a system 250. The system 250 is substantially similar to the system 220, but includes more than one web server computer (shown as server computers 1, 2, . . . J). A web load balancing system 252 balances load on the several web server computers. Load balancing is a technique well-known in the art for distributing the processing load between two or more computers, to thereby more efficiently process instructions and route data. Such a load balancer can distribute message traffic, particularly during peak traffic times.

A distributed file system 254 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

Referring to FIGS. 3 through 18, representative computer displays or web pages will now be described with respect to entering an order, which in the depicted example, is for an eyewear prescription. The screens may be implemented in C++ or as web pages under XML (Extensible Markup Language) or HTML (HyperText Markup Language) scripts that provide information to a user. The screens or web pages provide facilities to receive input data, such as a form with fields to be filled in, pull-down menus or entries allowing one or more of several options to be selected, buttons, sliders, or other known user interface tools for receiving user input. For example, while cascading menu ways of displaying information to users is shown and described herein, those skilled in the relevant art will recognize that various other alternatives may be employed. The terms "screen," "web page" and "page" are generally used interchangeably herein. While C++, XML and HTML are described, various other methods of creating displayable data may be employed, such as the Wireless Access Protocol ("WAP").

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Figure 3:
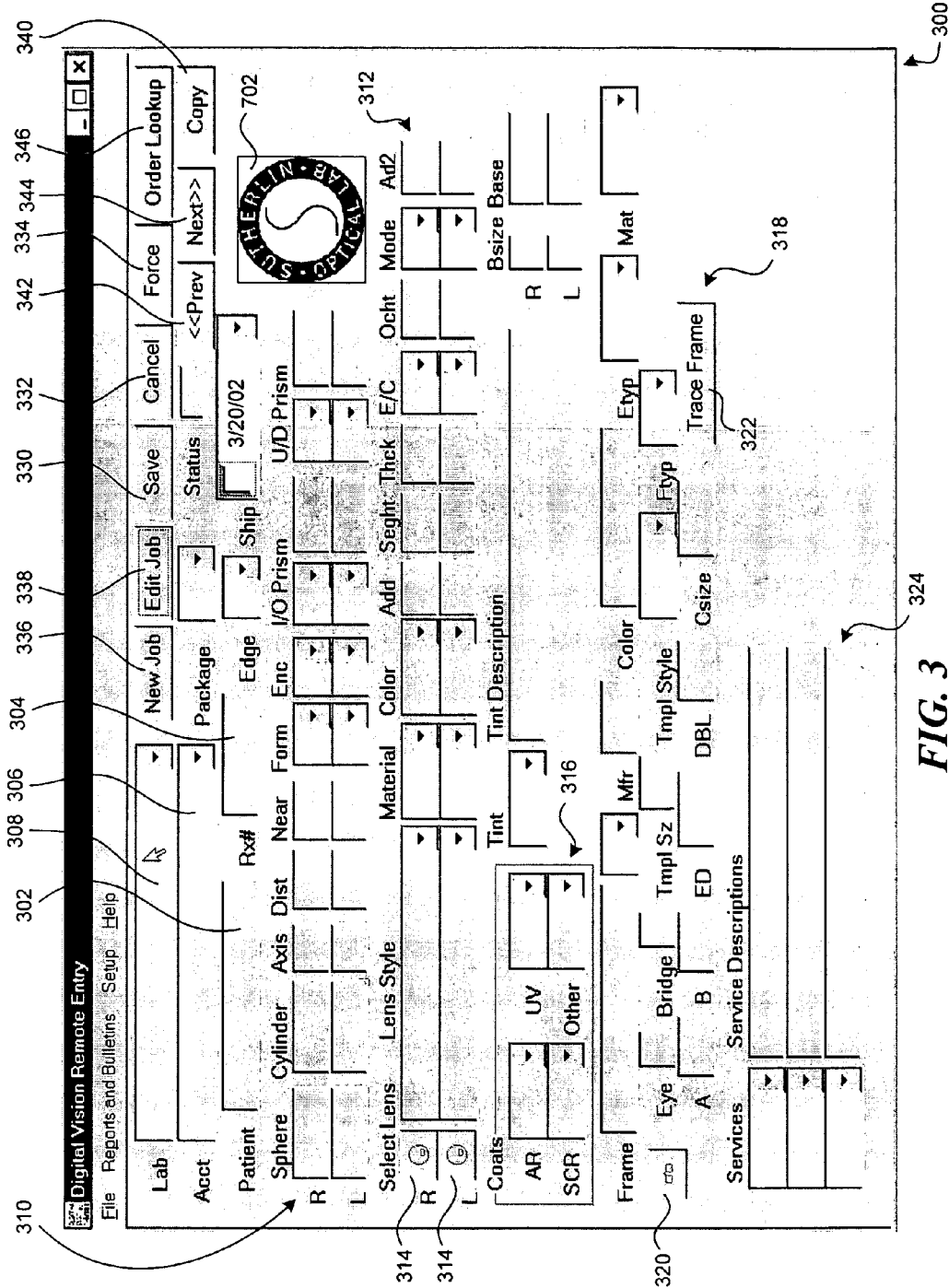
FIG. 3 is a computer screen shot showing a suitable electronic form for inputting a prescription for eyewear.

Referring to FIG. 3, an example of an electronic order entry form is shown as a form 300. Unless described otherwise herein, the fields depicted in FIG. 3 (and the other figures), and associated functions are well known or described in detail in the above cross-referenced provisional patent applications. Indeed, much of the detailed description provided herein is explicitly disclosed in the provisional patent applications; much of the additional material of aspects of the invention will be recognized by those skilled in the relevant art as being inherent in the detailed description provided in such provisional patent applications, or well known to those skilled in the relevant art. Those skilled in the relevant art can implement aspects of the invention based on the Figures and the detailed description provided in the provisional patent applications.

Many of the melds shown correspond to fields or blanks on a eyeglass prescription order. Even though numerous fields are displayed, not all need be used on a given order, and operators may find that they never use some fields. Each laboratory utilizes an almost identical screen. (Note: the terms "operator" and "user" are used interchangeably herein.)

The electronic form 300 is generally divided into several portions or sections: an ECP section, a prescription section, a lens section, a coating section, a frame section, and an additional services section. The ECP section includes a patient field 302 for inputting the name of a patient associated with an order to be placed, and a prescription number field 304 that may reflect a number associated by an ECP for that particular patient or patient's prescription. An account field 306 allows an office to differentiate between accounts, such as separate accounts for different optometrists sharing an office. A lab field 308 allows the operator to select one of several lens labs, and is described below with respect to FIG. 7.

A prescription section 310 allows an operator to input standard information regarding a prescription, such as sphere, cylinder and axis. Additionally, the operator may input a pupil distance in "Dist" and "Near" fields. A "Form" field (with drop-down choices) allow the operator to explain how pupil distance is measured for a particular prescription. An enclosed or "Enc" field with drop-down menu choices allows the operator to indicate whether a lens is enclosed. For example, if a patient is blind in one eye, a balance lens may be ordered. The in/out and up/down prism values ("I/O Prism and U/D Prism") fields are also provided for a prescription.

A lens section 312 likewise includes many standard fields for specifying lenses for the prescription. Such fields include a lens style, lens material and lens color, all with drop-down menus that are described below. For multifocals, an "add" field is provided. An ECP then also specifies a segment height (in a "Seght" field) to specify a position of the bifocal. Thickness ("Thck") and edge or center ("E/C") fields allow an operator to specify thickness of a lens, and whether the thickness is measured at the edge or center of that lens. Height of the optical center ("Ocht") and from where it is measured ("Mode") fields further allow the operator to specify a prescription. Finally, a further add field ("Ad2") field allow the operator to specify additional add values, which may be provided for certain vocational lenses.

Importantly, in the depicted embodiment of FIG. 3, left and right lens select buttons 314 are provided. By clicking on these buttons (or using drop-down menus from the Lens Style, Material or Color fields), an operator may access a series of cascading menus and select options therefrom to quickly specify lenses for a prescription.

Figure 4A:
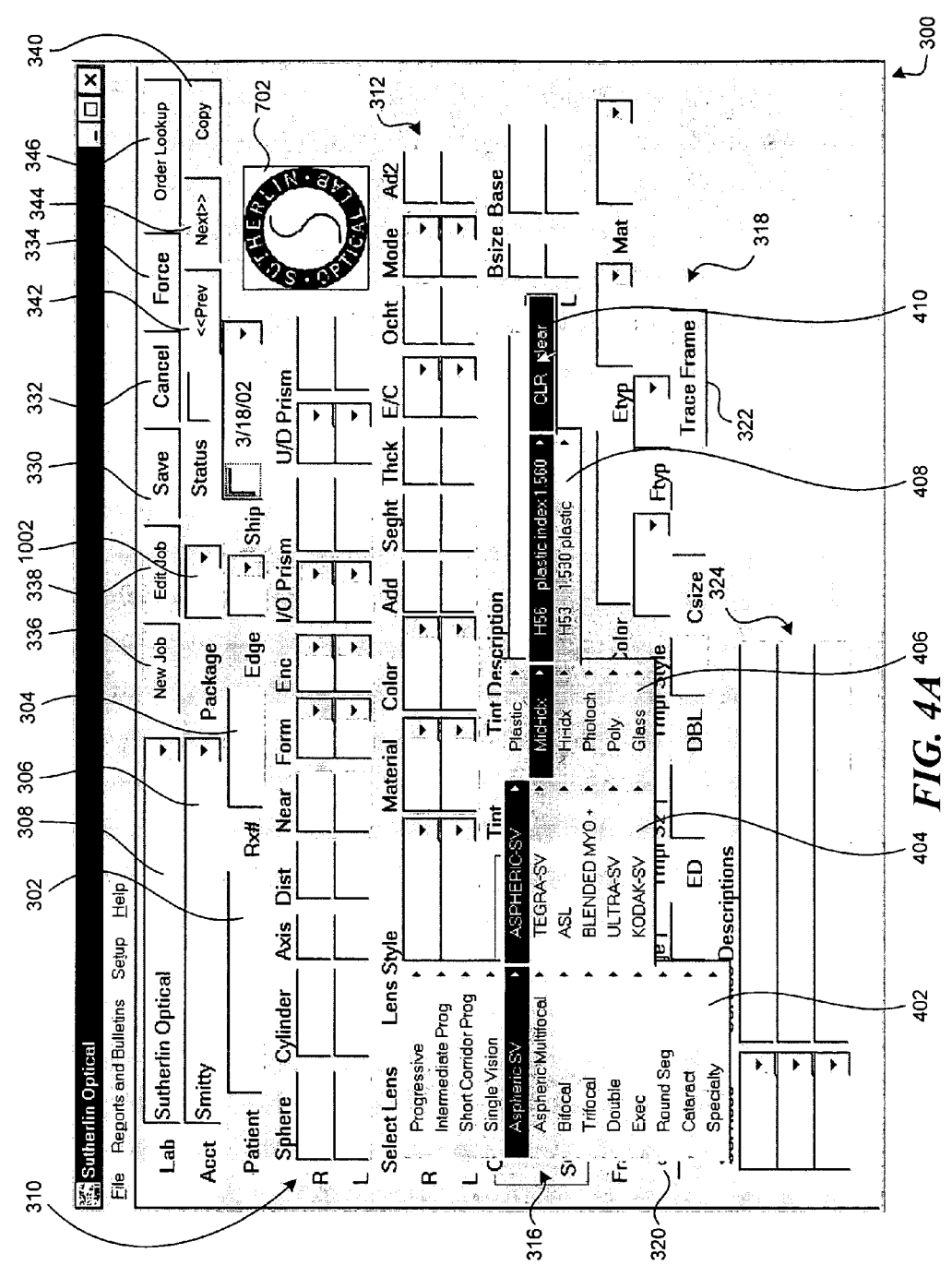
Figure 4B:
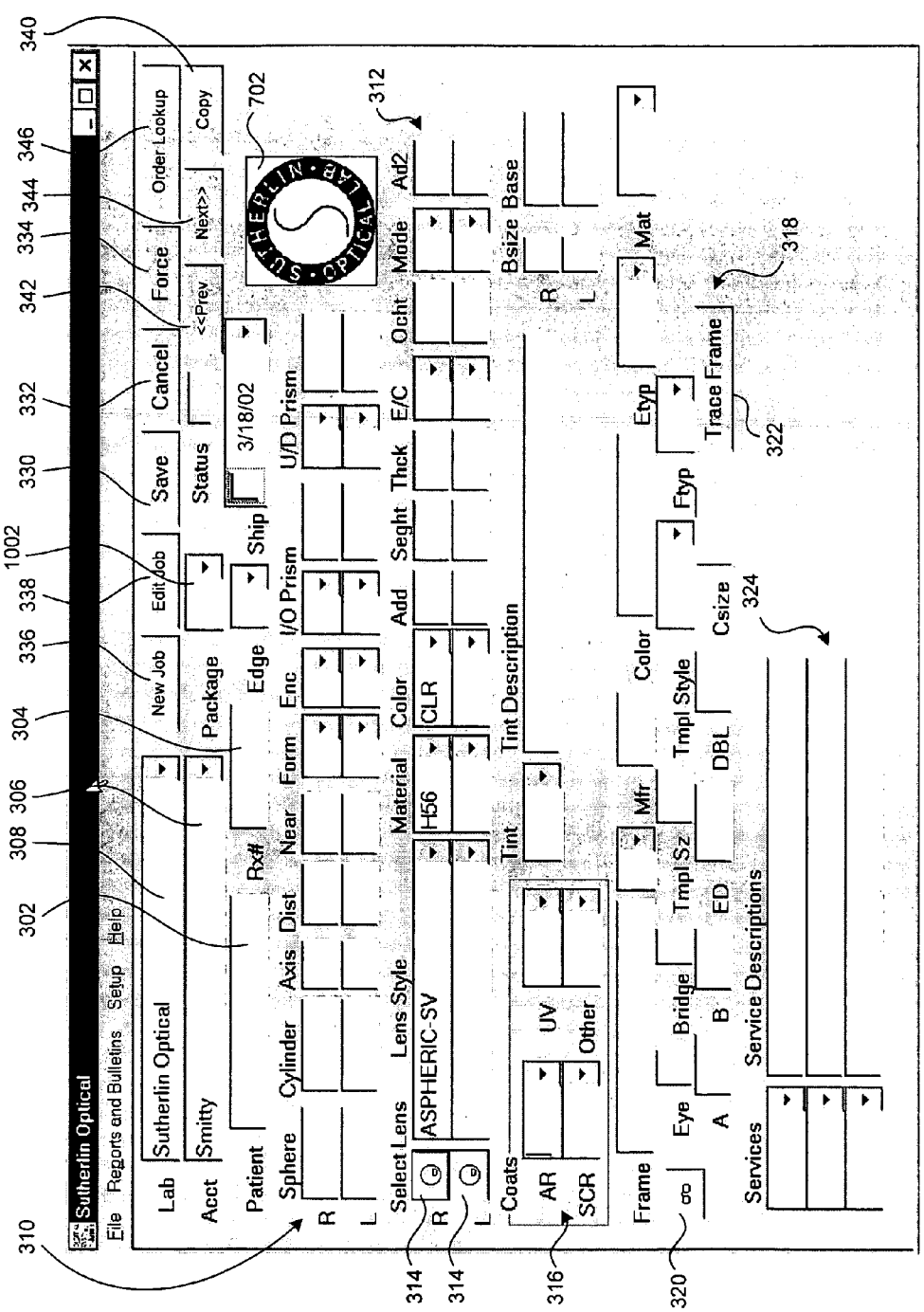
FIG. 4B is a computer screen shot showing the electronic form of FIG. 3 with an "Aspheric SV" lens selected by the series of menus of FIG. 4A.

As shown in FIG. 4A, the operator has selected "Aspheric SV" in a lens type or style menu 402. The lens style menu 402 includes other options available to the operator for the particular lab specified in the lab field 308, including Progressive, Intermediate Progressive, Short Corridor Progressive, Single Vision, Aspheric Multifocal, and others shown in FIG. 4A. Having selected the "Aspheric SV" choice in menu 402, the system provides a menu of lens venders or manufacturers 404. As shown, the user chose a generic Aspheric SV lens, although the user may have selected other brands of Aspheric SV lenses. Having selected the lens manufacturer, the user selects a material from which the lens is constructed in a lens material menu 406. As shown, while the user has selected a middle index ("Mid-ldx") lens, the user may have selected plastic, glass, polycarbonate ("Poly"), high index ("Hi-ldx"), or photochromatic ("Photoch"). Each of the lens material choices further include sub choices in a material sub choice menu 408. As shown, having selected a middle index lens, the user has chosen model "H56 plastic index 1.560", although a "H53 1.530 plastic" choice is also available from the selected lab. Finally, the user selects a color from a color menu 410. In this case, only clear plastic is available, and thus is the only option shown in the lens color menu 410. After having selected all of these choices in a series of cascading menus shown in FIG. 4A, the system automatically completes the lens selection portion of the form 300, as shown in FIG. 4A.

Figure 5:
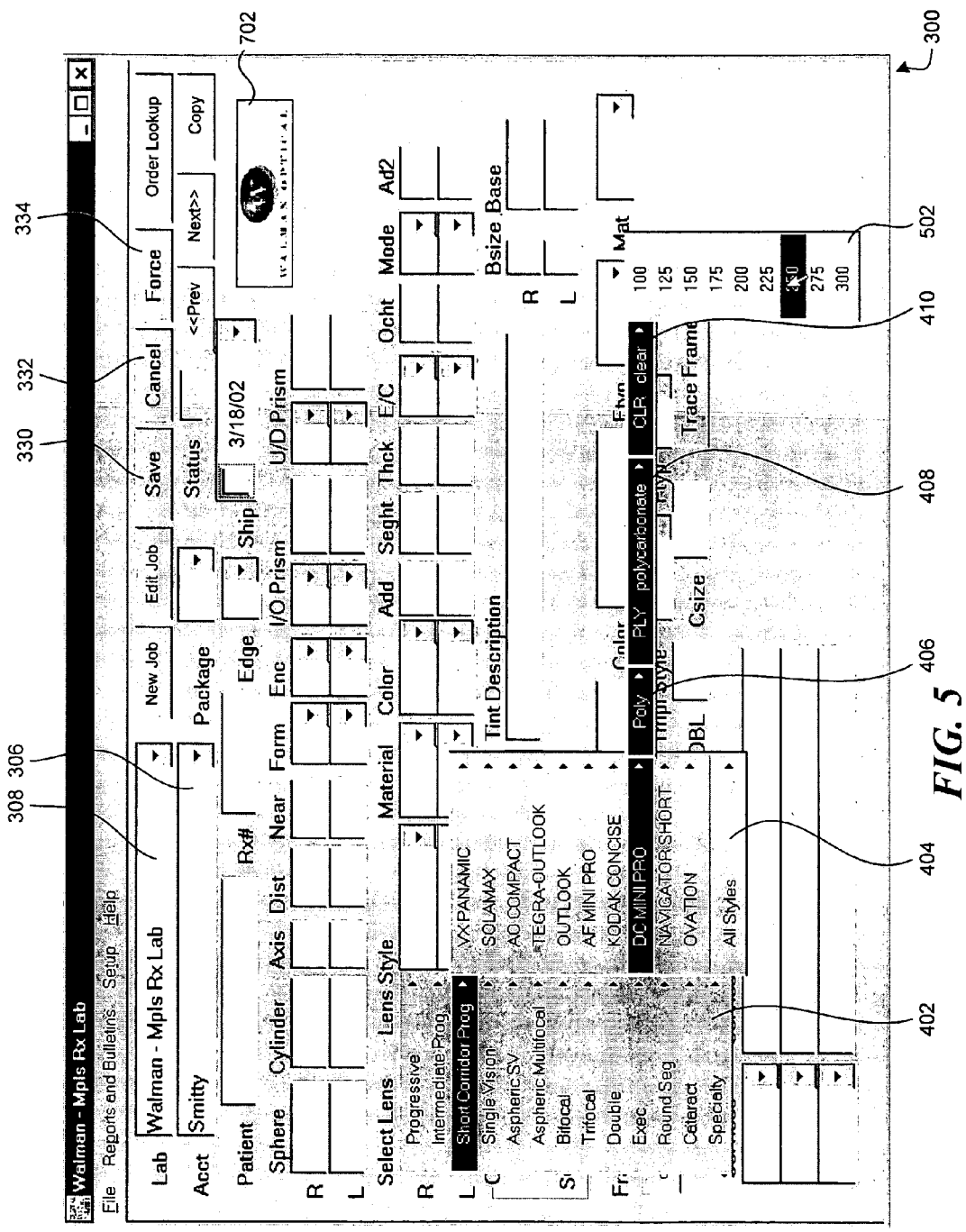
FIG. 5 is a computer screen shot illustrating a series of cascading menus for selecting a "short-corridor" progressive lens prescription, under a different example to that of FIG. 4A.
Figure 6:
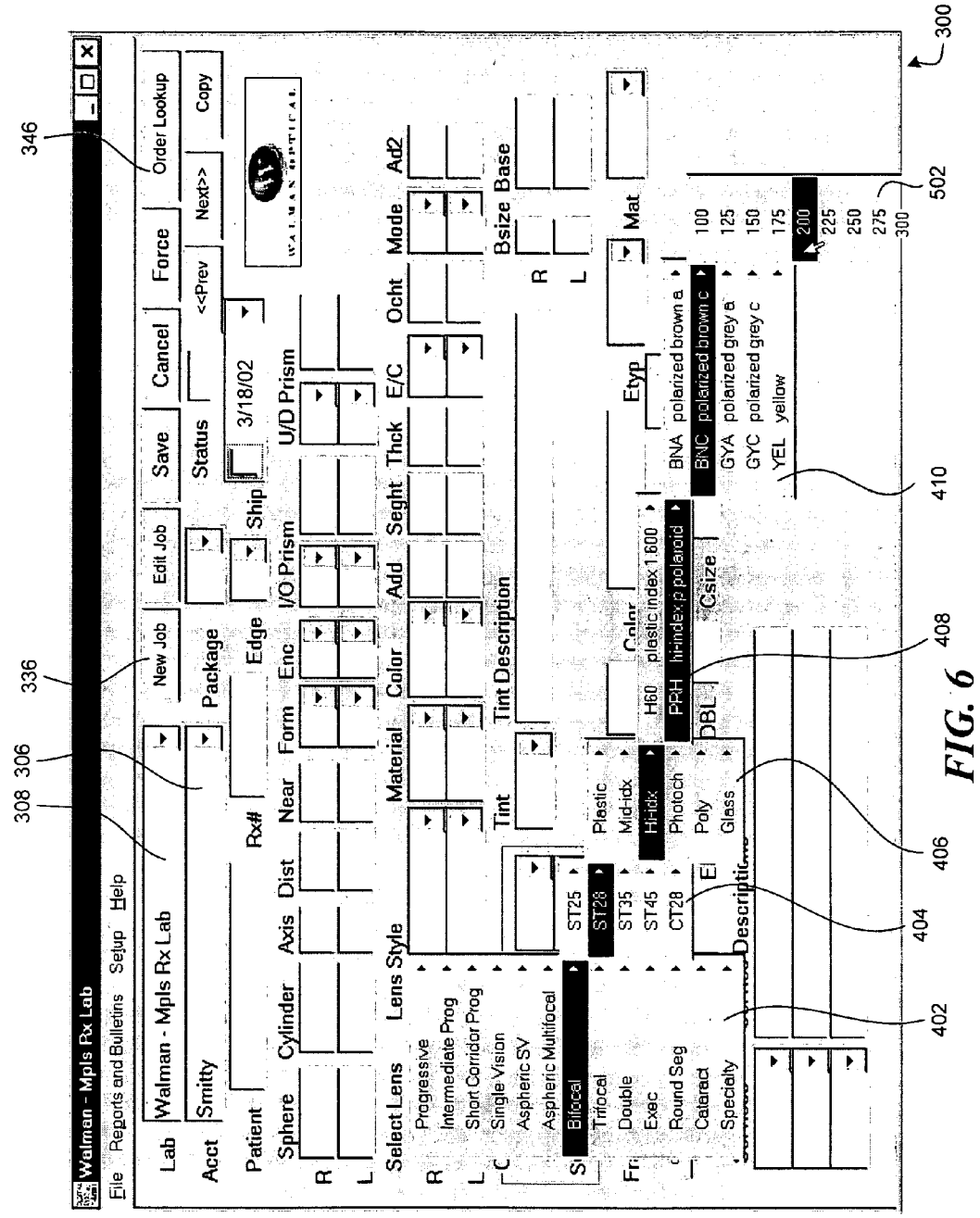
FIG. 6 is a computer screen shot showing an example of cascading menus for selecting a traditional bifocal lens prescription, under another example to that of FIG. 4A.

FIGS. 5 and 6 show examples of different menu options available when the operator selects different lenses in the lens type menu 402. For example, as shown in FIG. 5, the operator has selected a Short Corridor Progressive lens, and thus the system then presents the operator with a greater number of options in the manufacturer menu 404 than those shown in FIG. 4 for Aspheric SV. However, after selecting DC MINI PRO brand lenses, such lenses are only available in clear polycarbonate, and thus only a single choice is available in menus 406, 408 and 410. However, in the example of FIG. 5, since the prescription is bifocals, an add menu 502 is provided to permit the operator to input the bifocal strength.

FIG. 6 shows yet another example similar to FIGS. 4 and 5. In this example, the operator selects a "bifocal" lens type in lens type menu 402, which corresponds to 5 brands available by the lab under the manufacturer menu 404. As shown, the operator has selected a High Index polarized lens having a brown color.

Figure 7:
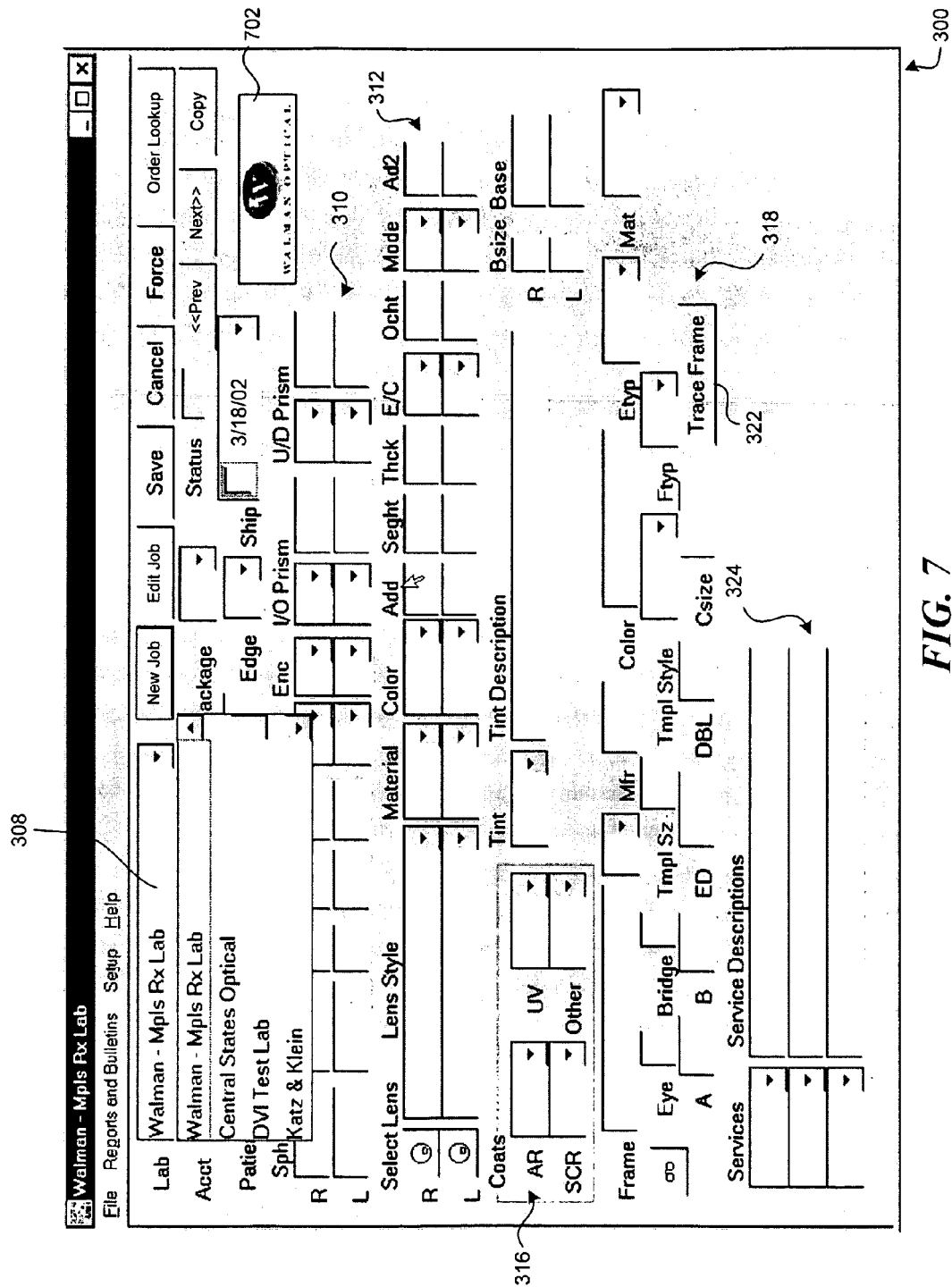
FIG. 7 is a computer screen shot showing an example of how a user may select one of several optical labs using the form of FIG. 3.

Referring to FIG. 7, an example of the electronic form 300 is shown with a drop-down menu of labs for the lab field 308. Using the drop-down menu of labs shown in FIG. 7, the operator may select one of several different labs to process the prescription. When selecting a lab, an icon 702 is displayed on the electronic form 300 to further indicate to the operator the particular lab selected. Further, the icon 702 provides advertising for the lab itself. Importantly, when a lab is selected, choices available for lenses, coatings and other options under the form are restricted to those provided by that lab. As a result, an operator may not order a product not provided by that lab.

Figure 8:
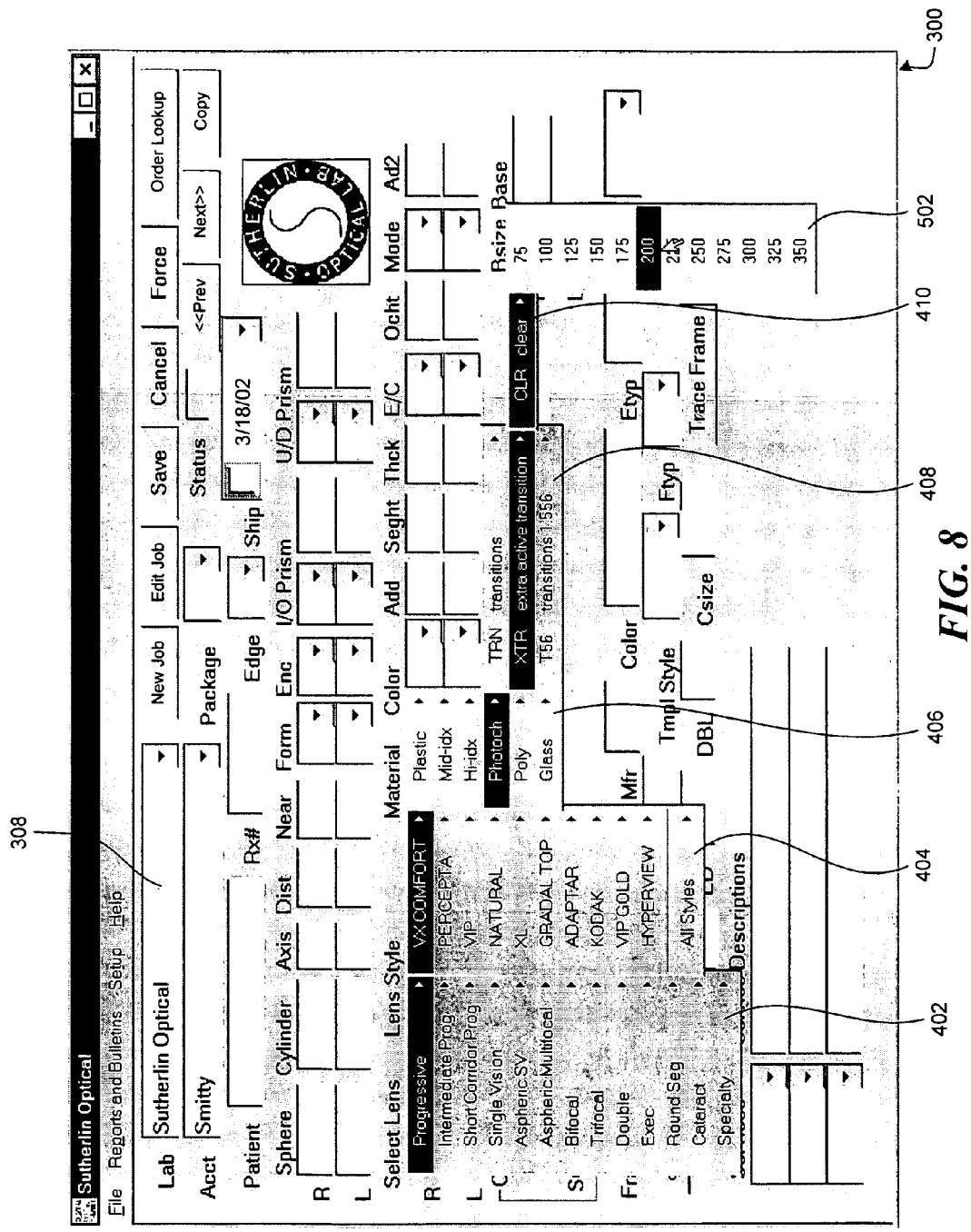
FIG. 8 is a computer screen shot showing a series of cascading menus and options for progressive lenses available when a user selects a particular optical lab.
Figure 9:
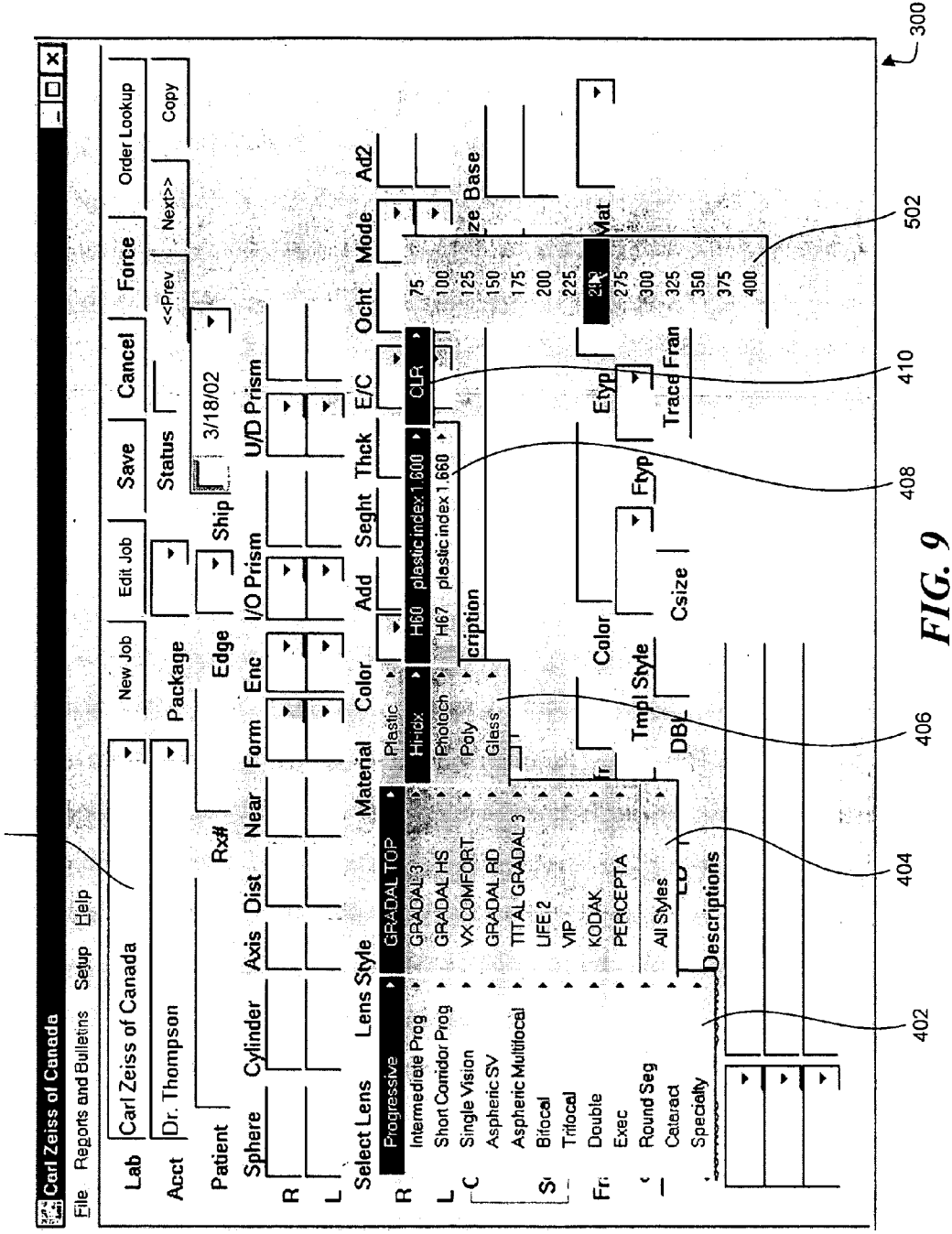
FIG. 9 is a computer screen shot showing another series of cascading menus and options available when a user selects progressive lenses from another optical lab.

Thus, as shown in FIG. 8, the lab "Sutherlin Optical" provides one series of progressive lens brands in the lens manufacturer menu 404. As shown in FIG. 9, a lab "Carl Zeiss of Canada" provides a different series of lens brands in the lens manufacturer menu 404 for progressive lenses. For example, Sutherlin Optical provides "HYPERVIEW" which Carl Zeiss of Canada does not, while Carl Zeiss of Canada provides "LIFE2", but Sutherlin Optical does not. Furthermore, each lab may specify how lens brands are listed in the lens manufacturer menu 404. A lab, for example, may list brands in decreasing order of the lab's preference, from top to bottom. Alternatively, they may list lenses in another order, such as those most preferred by the lab, those that are most popular, etc.

Figure 15:
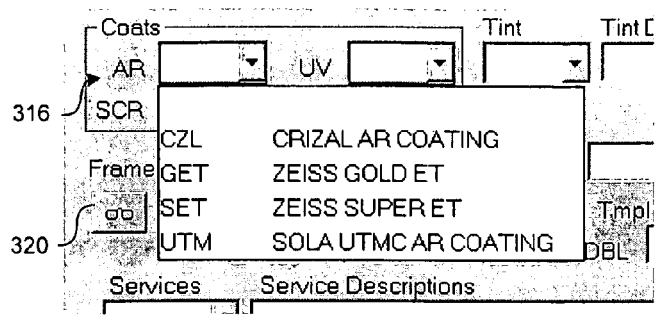
FIG. 15 is a computer screen shot showing a portion of the electronic form of FIG. 3 with a drop-down menu listing anti-reflective coating options available.

Referring back to FIG. 3, a coating section 316 provides various lens coating options available by a given lab specified in the lab field 308. Lens coatings include antireflective ("AR"), ultraviolet ("UV"), scratch resistant ("SCR") and any other coatings available. Drop-down menus associated with these coatings correspond to various manufacturers or lens coating types. For example, FIG. 15 shows an example of four anti-reflective coatings available when a drop-down menu button associated with the AR field is selected. The drop-down list will only display coating options available with previously selected lens style and materials. The lab selected controls the order in which coatings are displayed in the drop-down coating menu. A tint field allows the operator to specify whether the lenses are to be tinted. A "Dint Description" field allows the operator to specify a color and hue of the tint to be applied, such as "rose-15" or "grey-3".

A frame description section 318 allows the operator to specify the frames associated with a prescription. As explained below, a frame button 320 allows the operator to select a frame from a series of cascading menus, in a manner similar to that for the lens select buttons 314. Most of the frame fields are standard. For example, the operator may specify a frame in a "Frame" field, or specify a frame type from a drop-down menu associated to the left of the frame field. A dropdown menu box next to the "Frame" field provides a frame status. The user utilizes the frame status field to specify whether the lab should supply the frame, the ECP will send the frame to the lab (frame to come), or whether the ECP desires the lab to send lenses only, as explained herein. Likewise, the operator may identify frames using the following fields: manufacturer field ("Mfr"), color field, eye size field ("Eye"), bridge size ("Bridge"), temple size ("Templ Sz"), temple style ("Templ Style") and frame type ("Ftyp", which can refer to different types of frames, such as sunglass type). The operator may select an edge type for the frame using an "Etyp" field, which may correspond to edges that are rounded, grooved, etc. Further, the operator may select a material from which the frame is constructed using a "Mat" field. At a minimum, an operator may specify horizontal and vertical diameters ("A" and "B"), a longest diameter of the frame ("ED"), a distance between lenses ("DBL"), and a circumference of the lens ("Csize").

Figure 20:
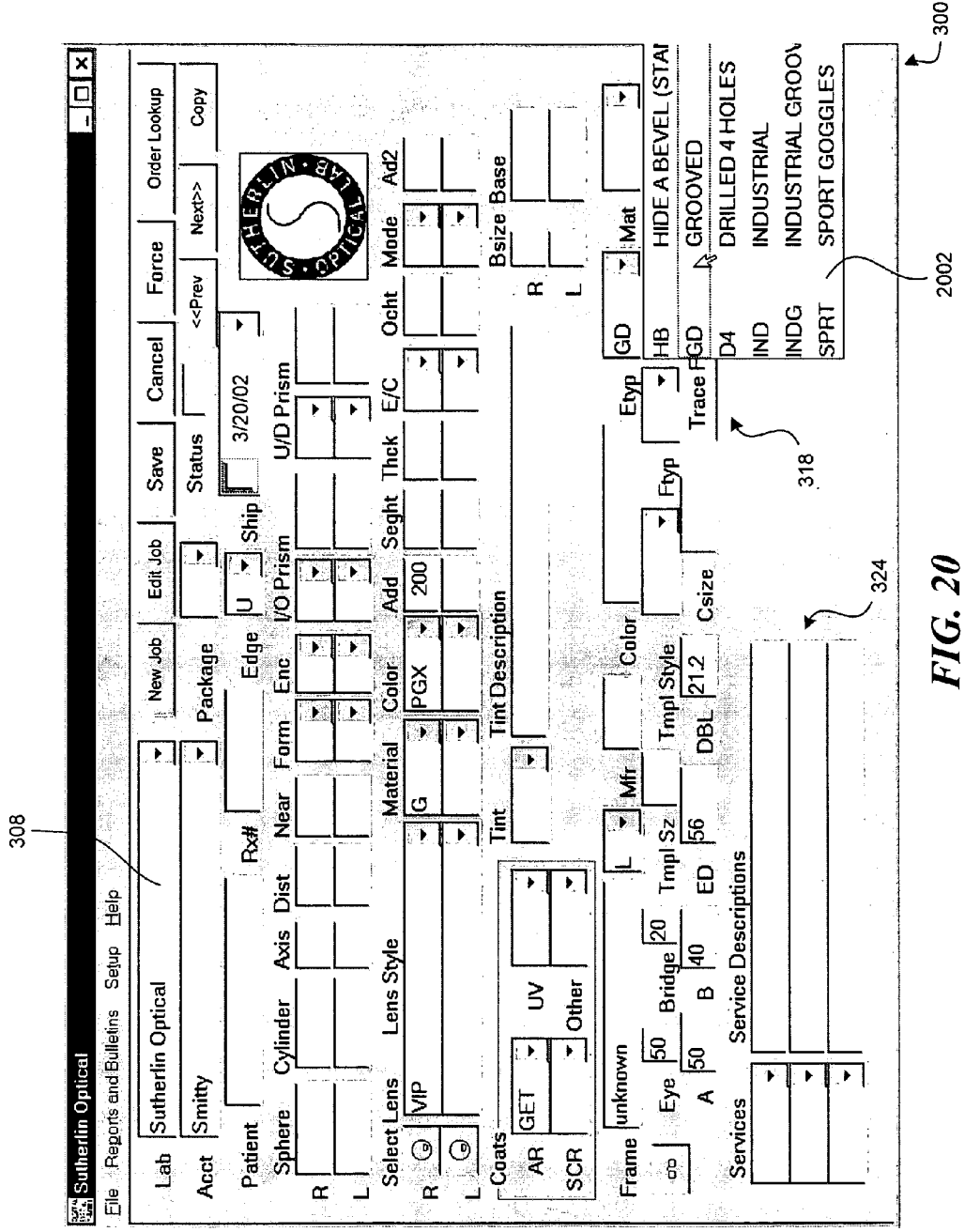
FIG. 20 is a computer screen shot showing an example of minimal frame information being provided in the form of FIG. 3.

Referring to FIG. 20, an example of a partially completed form 300 shows effectively a minimum amount of information that the system requires a user to complete in the frame description section 318. As shown, the frame is listed as "unknown," but the following fields are completed: I, Bridge, A, B, ED, DBL, and Etyp. As also shown in FIG. 20, a dropdown edge type menu 2002 is shown which lists available edge types for the selected lab. In this example, grooved (GD) is selected by the user.

The operator may also input a trace of the frame or demonstration lens by clicking a "Trace Frame" button 322. Inputting a frame trace to be appended as a digital file with the completed electronic form 300 is described below with respect to FIG. 18.

An additional services section 324 allows the operator to identify additional services the lab is to perform with respect to a given prescription. Each lab will have its own specific choices provided under drop-down menus in a "Services" field, such as being able to polish edges of a lens. A "Service Descriptions" field allow the operator to input any additional information necessary for the prescription to be communicated to the lab with the order.

The electronic form 300 includes additional information regarding lenses and order status. A "Edge" field has an associated drop-down menu that allows the operator to choose a default selected by the account identified in the field 306, or select between uncut, edged and mounted, or edged and not mounted for the order being completed. The operator may also select the blank size from which lenses are created by selecting right ("R") and left ("L") blank size ("Bsize"), and the base curve ("Base").

A "Ship" field provides an indication of an expected ship date for the lab specified in the lab field 308. A drop-down menu button associated with the ship field displays a calendar (not shown) with the expected ship date highlighted. The operator may select a different date, which may be communicated to the lab. By selecting a different date, a checkbox to the left of the date in the Ship field is selected (otherwise it is left blank for a default expected date). The lab may then flag such an order and possibly communicate back to the operator ordering the lenses to confirm whether a ship date is possible. A "status" field indicates whether either an order is in process (with an "I" value), or has been shipped (indicated by a "S" value).

The electronic form 300 includes buttons to permit order entry and status checking. A save button 330 allows the operator to save a partially or fully completed form, while a cancel button 332 allows the operator to cancel completion of a form and clear all fields. A force field 334 allows the operator to force a particular selection in a field where the system prohibits such an entry.

A new job button 336 allows the operator to start a new form, while an edit job button 338 allows the operator to select from several saved forms to edit. A copy button 340 allows the operator to copy a fully or partially completed form into a new form. Previous and next buttons 342 and 344, respectively, allow the operator to move through a series of saved forms. An order look-up button 346 allows the operator to request status on pending orders, as described below.

Figure 10:
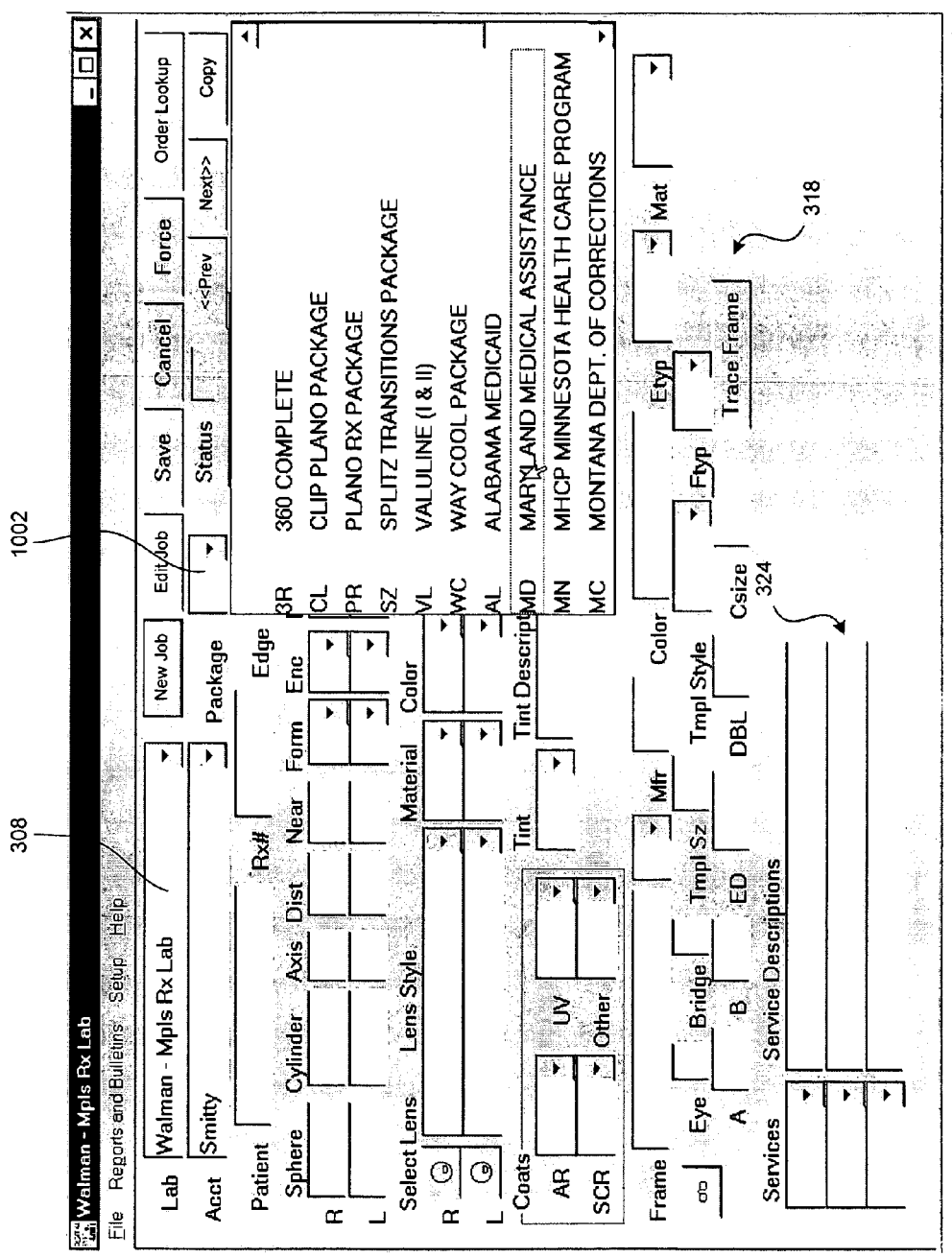
FIG. 10 is a computer screen shot showing how a user may select one of several promotional or package options.

Referring to FIG. 10, a package field 1002 includes a drop-down menu of various promotional packages or optical plan packages provided by the lab specified in the lab field 308. Many laboratories have marketing programs ("packages") in place to encourage ECPs or "accounts" to buy certain combinations of lenses/frames. A frequent example of this would be children's programs where certain frames are included in the price of a polycarbonate (lens material) lens. A frequent error made here is that the user does not know what the "package" availability is and thus orders products outside the program without knowing.

Figure 12:
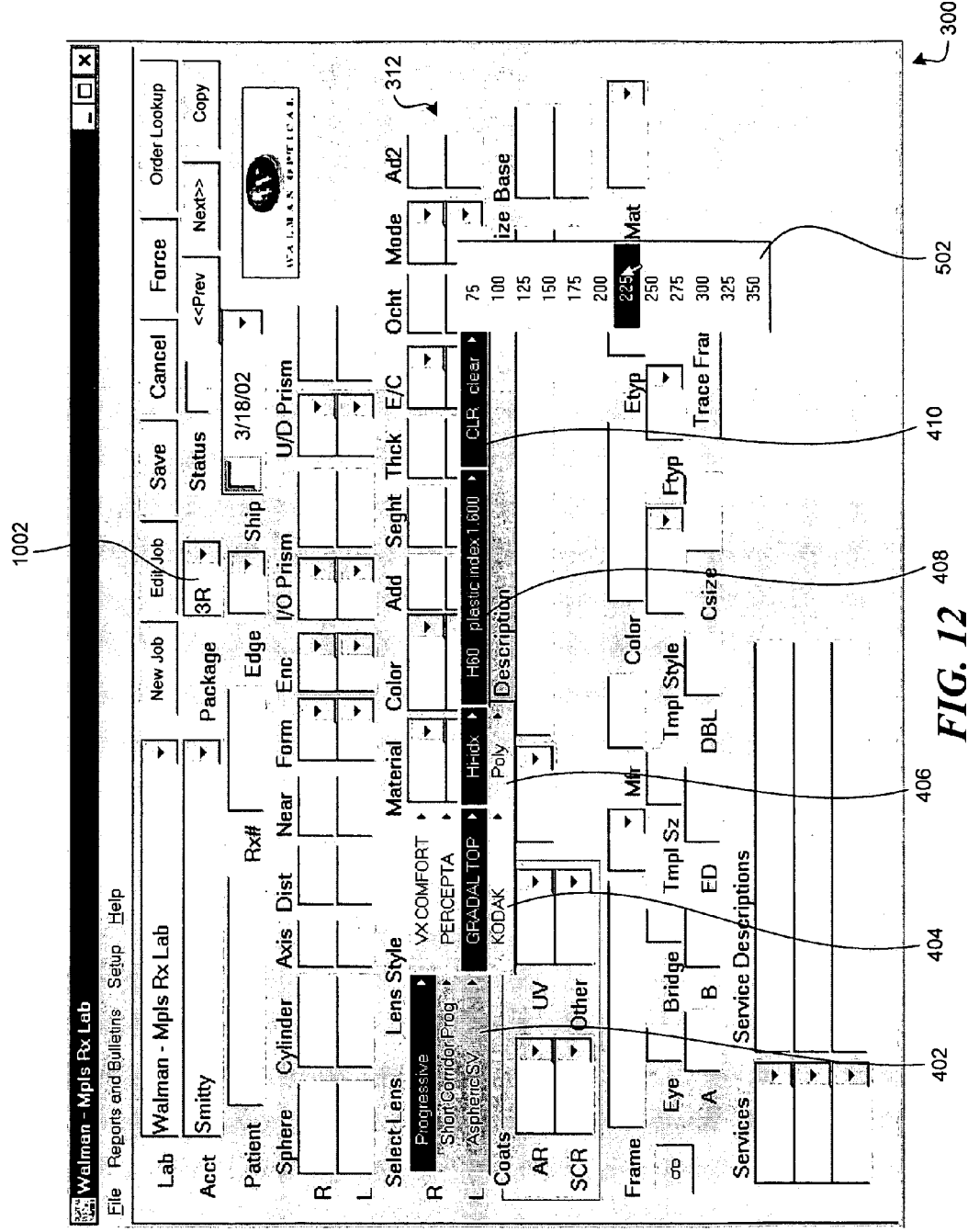
FIG. 12 is a computer screen shot showing a series of cascading menu options available when the user selects another program option.
Figure 13:
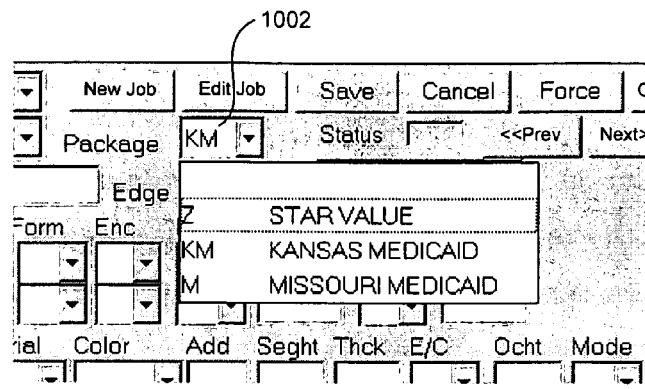
FIG. 13 is a computer screen shot showing a portion of the computer screen of FIG. 10 with another package selected.
Figure 14:
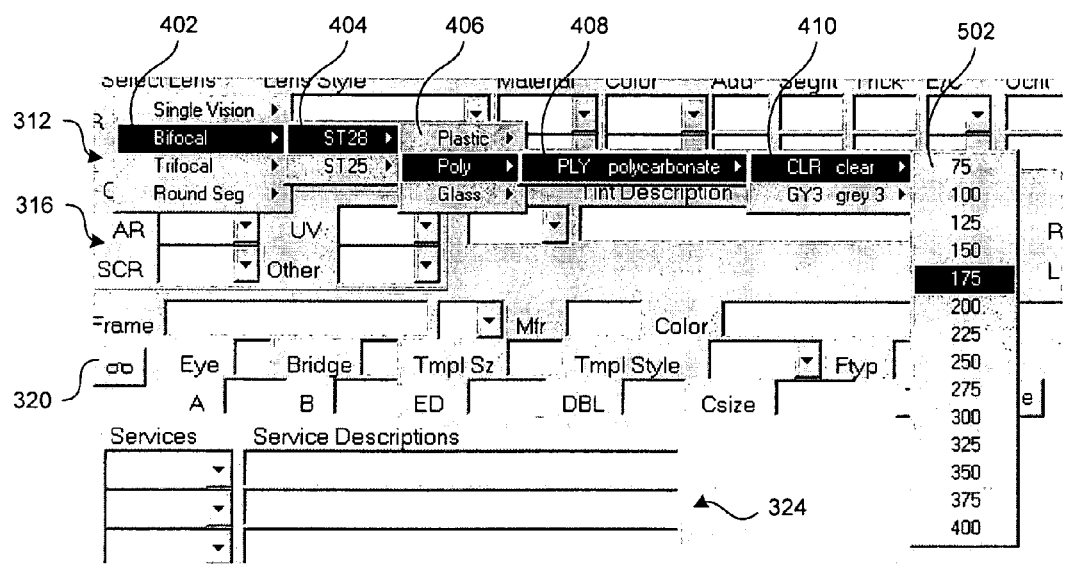
FIG. 14 is a computer screen shot showing a reduced number of options under cascaded menus based on the package selected under FIG. 13.

As shown in the example of FIG. 10, the operator is selecting a "Maryland Medical Assistance" package, which is associated with a series of restricted options available under that program. The program may be associated with a particular insurance plan, and as shown in FIG. 10 has an associated designator "MD." Shown in FIG. 11, if the operator chose trifocal lens type in the lens type field 402, only two brands are available in the manufacturer menu 404, and two types of materials in the material menu 406 for the MD package. Compare this to the choices available in FIG. 6 (albeit for bifocals) for the same specified lab. As another example, FIG. 12 shows options available when the operator selects the "360 Complete" package (designated by "3R"), which provides for only progressive, short corridor or progressive and aspheric SV lenses. Under progressive, only four brands are available (as compared to ten brands available as shown in FIG. 8 [albeit for a different lab]). FIG. 13 shown another example of the operator selecting a Kansas Medicaid package "KM," while FIG. 14 shows how, under this package, options for bifocals lenses are restricted.

In effect, by selecting any particular package or promotion under the package field 1002, the system restricts the number of options provided in the cascading menus. Certain manufacturers may offer promotions to labs. For example, a Carl Zeiss may offer a promotion on lens coatings to labs to try to convince labs to purchase more from them than from competitors. The labs may take advantage of this promotion by adding such a promotion to their offerings as presented to the operator when that lab is selected in the lab field 308. Thus, if a ECP selects the Zeiss promotional package, then only coatings offered by Zeiss will be provided in the coating portion 316.

When the operator selects a package in the package field 1002, the system not only ensures that the operator selects products and options provided by the selected lab, but also ensures that the product combination is available under the particular package program. The system may thus check for compatibility under the program for the following fields: lens style, lens material, lens color, lens coats, lens tints and frame. For example, the AM package shown in FIGS. 13 and 14 allows only two bifocal lens types and does not allow high-index or photochanging materials.

Figure 16:
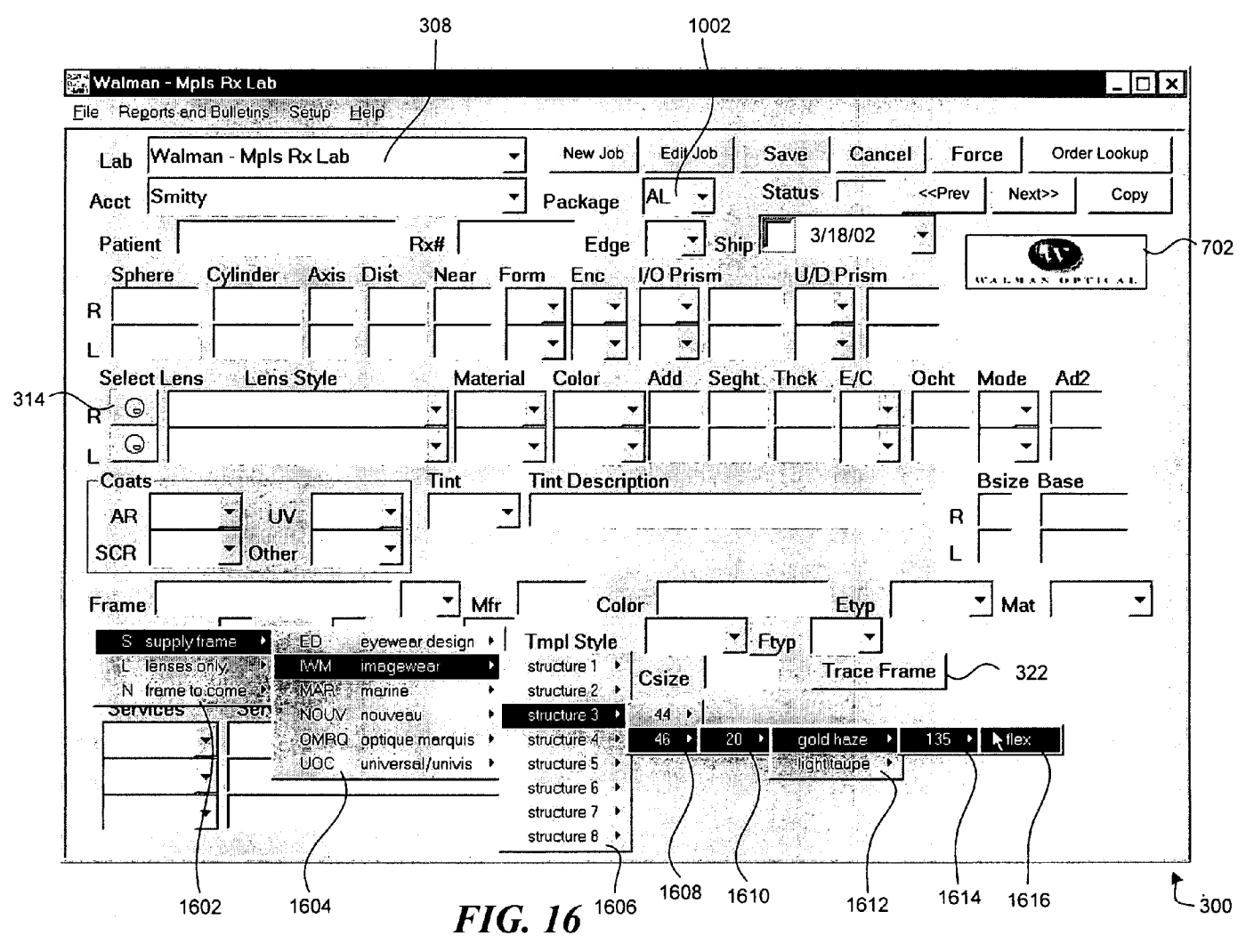

Referring to FIG. 16, when the operator selects the frame select button 320, the system provides a frame option box 1602. The frame option box allows the operator to select whether the lab is to supply the frame (option "S"), whether the order applies to lenses only (option "L"), or whether the operator will later send the frame (option "N"). If the lab is to supply the frame (options "S"), then the system presents to the operator a frame vendor menu 1604. Based on the manufacturer selected, the system presents a vendor's product menu 1606, a frame eye size menu 1608, a bridge size menu 1610, a color menu 1612, a temple size menu 1616, and a temple style menu 1616. If the lab will not be supplying the frame, some information, such as temple specifications, is irrelevant, and the system does not ask the operator to provide this information. In the example of FIG. 16, the Alabama Medicaid package ("AL") is selected in the package field 1002, and thus only six brands of frames are provided in the manufacturer menu 1604.

Figure 17A:
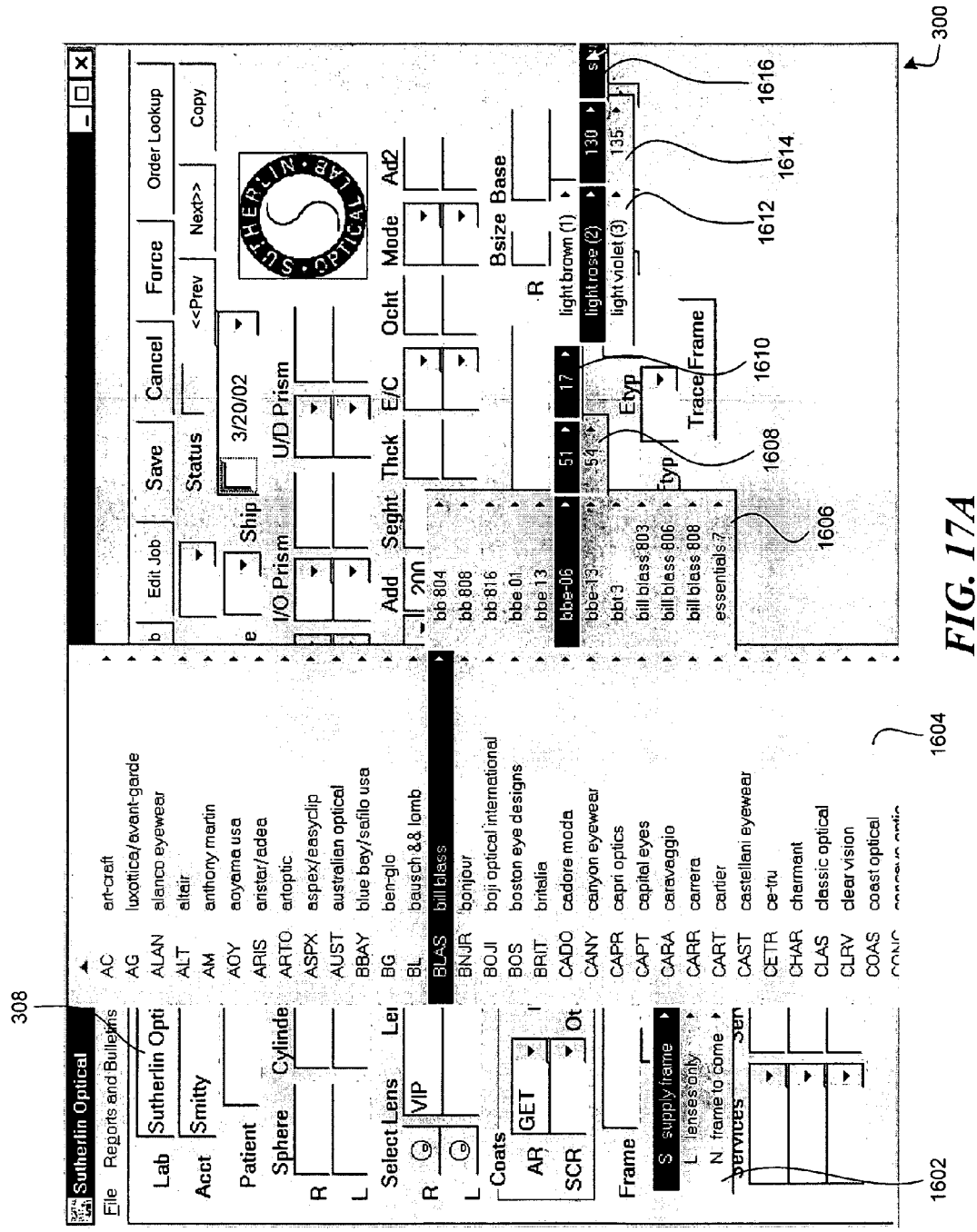
FIG. 17A is a computer screen shot showing an alternative to FIG. 16, with numerous frame options depicted.
Figure 17B:
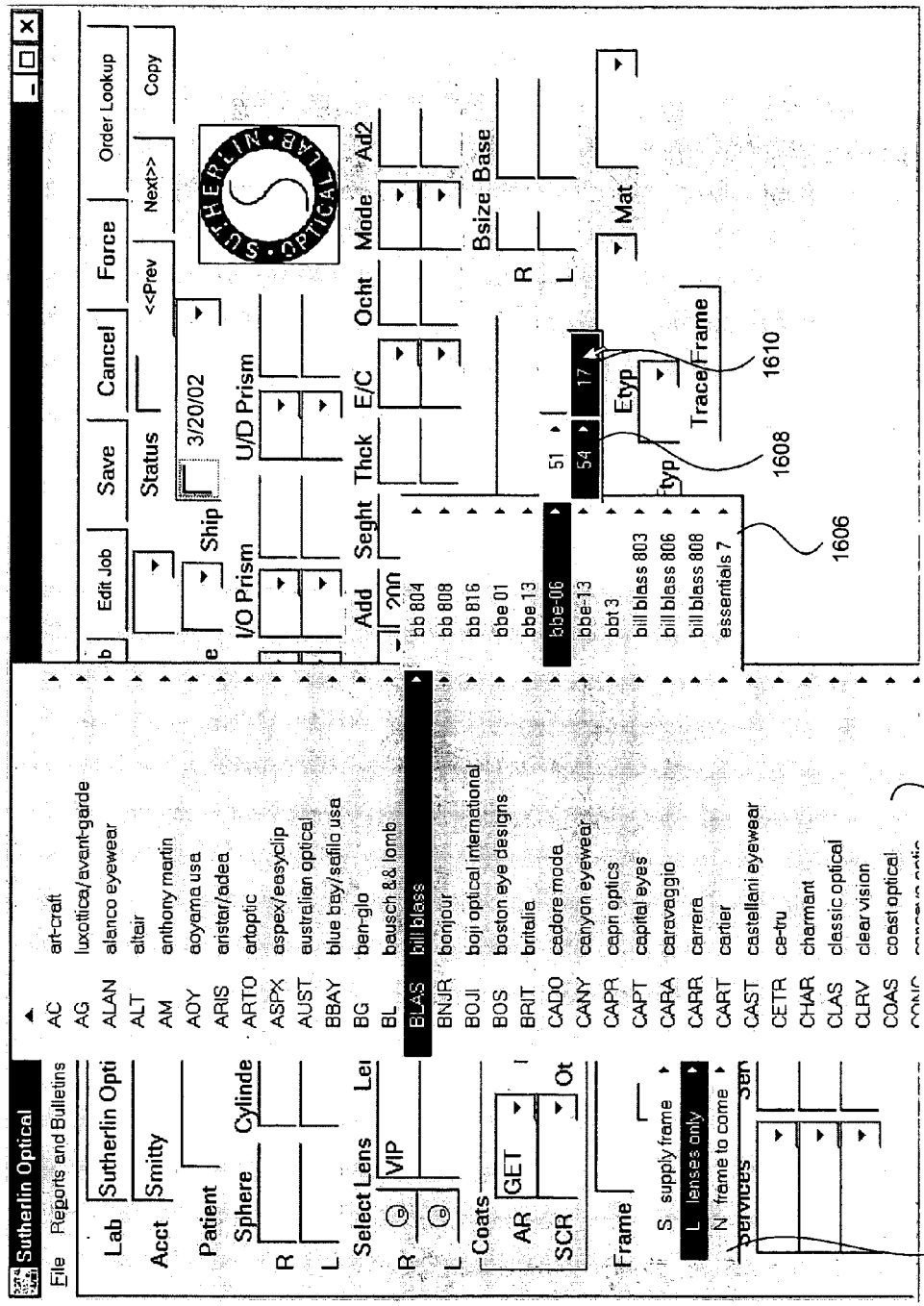
FIG. 17B is a computer screen shot showing an alternative to FIG. 17A, where the lab is to supply lenses only.

Referring to FIG. 17A, if no package is selected, and the lab is to supply the frame, then the choice of frames is greatly increased. As shown in FIG. 17A, the manufacturer menu 1604 includes numerous brands of frames provided by the selected lab. In the example of FIG. 17A, since the lab is supplying the frame, the system requires the user to select options from all menus 1604 through 1614 for, in this example, a particular "Bill Blass" frame. However, if the lab is to provide the lenses only, the use need only supply certain information. Thus as shown in FIG. 17B, the user has requested the lab to supply only the lenses for the same Bill Blass frame selected in FIG. 17A, and thus the user need only complete the frame vendor menu 1604, vendor's product menu 1606, frame eye size menu 1608 and bridge size menu 1610. If the user were to enclose the frame with the order, the user may also wish to complete the "color" field noted above.

Figure 21A:
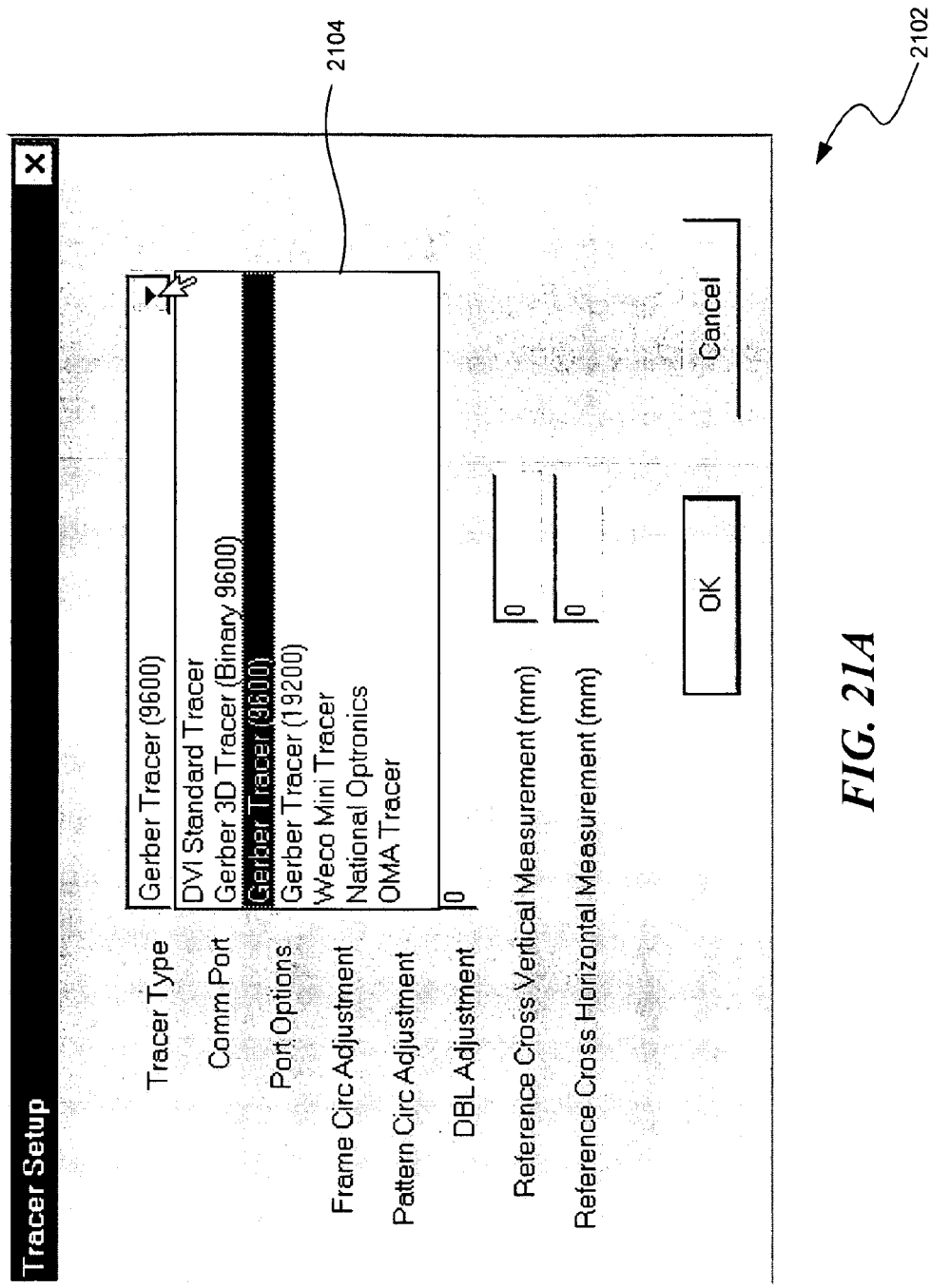
FIG. 21A and FIG. 21B are computer screen shots showing a frame trace setup module for initializing compatibility between a frame tracer and the electronic form of FIG. 3.
Figure 21B:
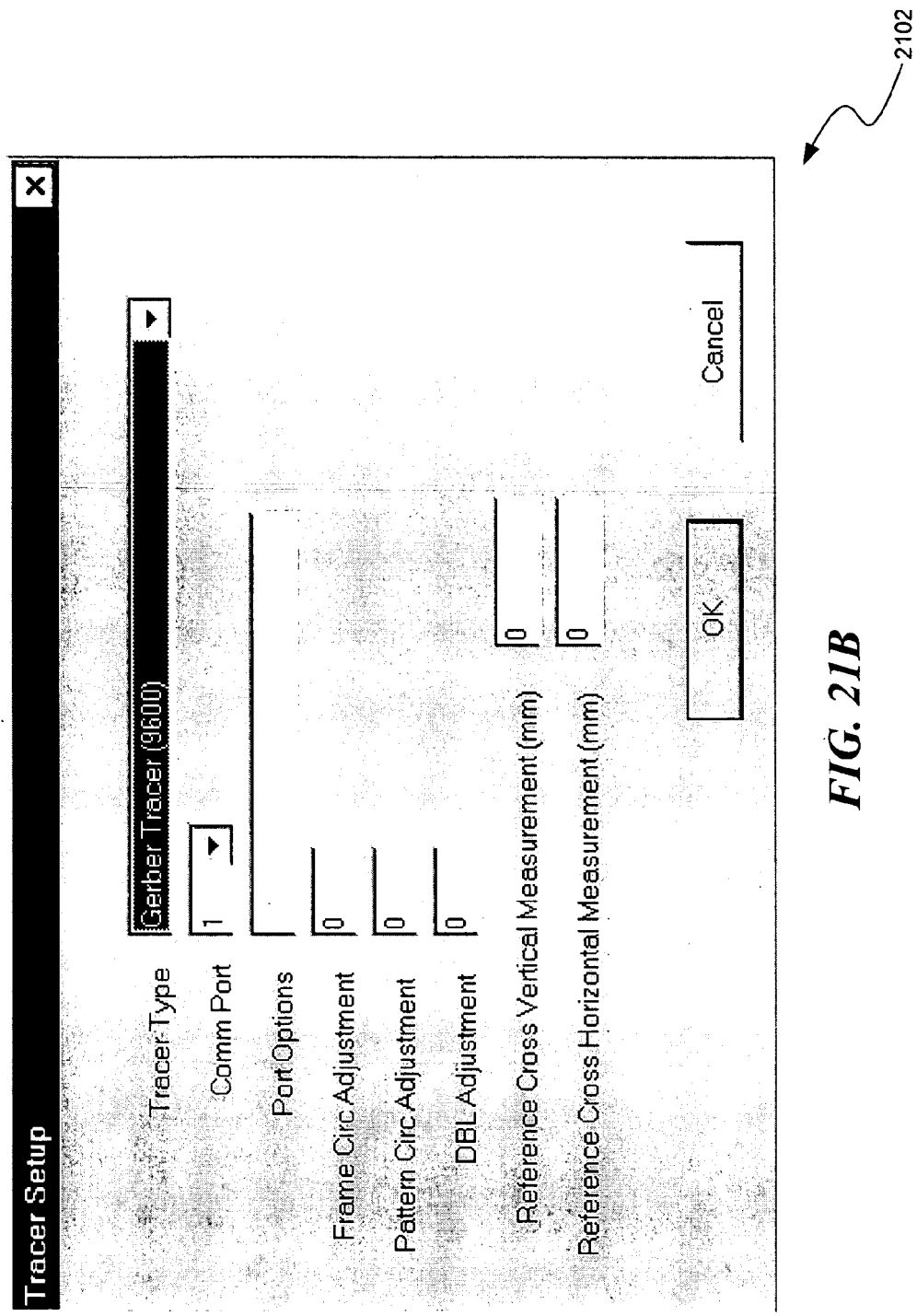

As noted above, the system integrates with frame tracers or frame digitizers that provide electronic files representing the geometry of a lens or frame to receive a lens. Many frame tracers are available, and the system provides modules for each, such that the user computer 100 or 202 may import files from such tracers and append them to a completed electronic form 300. When the operator selects the frame trace button 322, the system first determines whether frame tracing has been initialized. If not, then the system provides a series of menus to permit the operator to set up and integrate frame-tracing functionality with the electronic order system described herein. Referring to FIG. 21A, the system provides a menu 2102 that lists various frame tracers in a drop down menu 2104, and the operator may select the appropriate frame tracer from the menu. After selecting the appropriate frame tracer from the drop down menu 2104, the user may select a communication port on the computer, any port options associated with that port, frame and pattern lens circumference adjustments, distance between the lenses (DBL) adjustment, and horizontal and vertical reference cross measurements, as shown in FIG. 21B.

Figure 18:
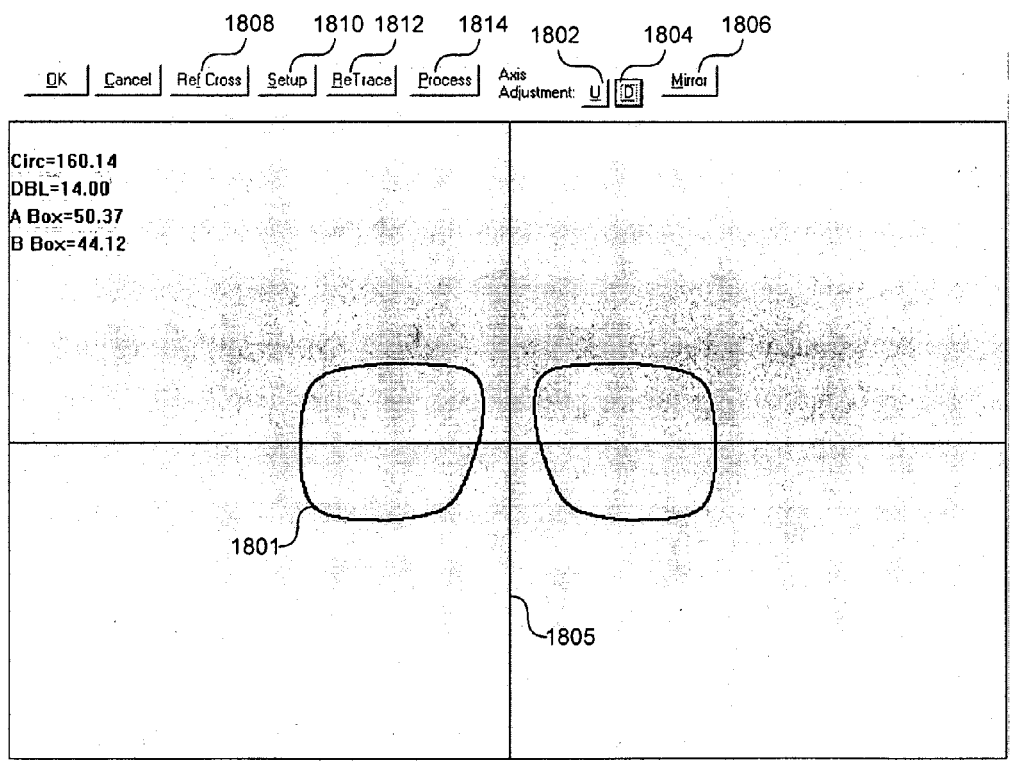
FIG. 18 is a computer screen shot showing a frame trace module for manipulating and inputting digitized data files reflecting lens shapes.

Once selected, the system then launches the appropriate frame-tracing module. For example, if the user has the digitizer tablet DVI GeoTrace "GT" digitizer by Digital Vision, Inc., then the system presents screen 1800 as shown in FIG. 18. The operator may trace a demonstration lens or the interior geometry of a frame, which then is displayed as a frame trace 1801. The operator may then select up or down axis adjustment buttons 1802 or 1804, respectively, to move a cross-hairs axis 1805 to center the digitized lens geometry. A mirror button 1806 allows the operator to rotate or flip the image displayed, so that it is shown right side up. The system automatically generates lens measurements A, B, DBL and lens circumference "Cir" (which corresponds to "Csize" in the form 300). The system may automatically input these values to the appropriate fields in the form 300.

The buttons 1802, 1804 and 1806 permit the operator to quickly trace a lens or frame and not require it to be centered. The lens can be upside down or backwards, and with the help of these buttons, the operator can orient the digitized image appropriately. The system portrays on the computer (in screen 1800) the left and right lenses in actual size, so that the operator can see whether the lenses had been digitized correctly. Thus, the screen 1800 provides a graphical user interface for the operator to accurately capture frame trace data for import to an electronic order.

The frame trace module includes additional functionality, which is depicted in FIG. 18. A RefCross button 1808 provides a method to scale the graphic depiction to a particular screen. A Setup button 1810 allows the user to enter values after selecting the RefCross button 1808 to scale graphics. A Re-Trace button 1812 allows the user to start over, while a Process button 1814 allows the user to store point data as a digitized frame trace file that can be appended to an electronic order.

Figure 19:
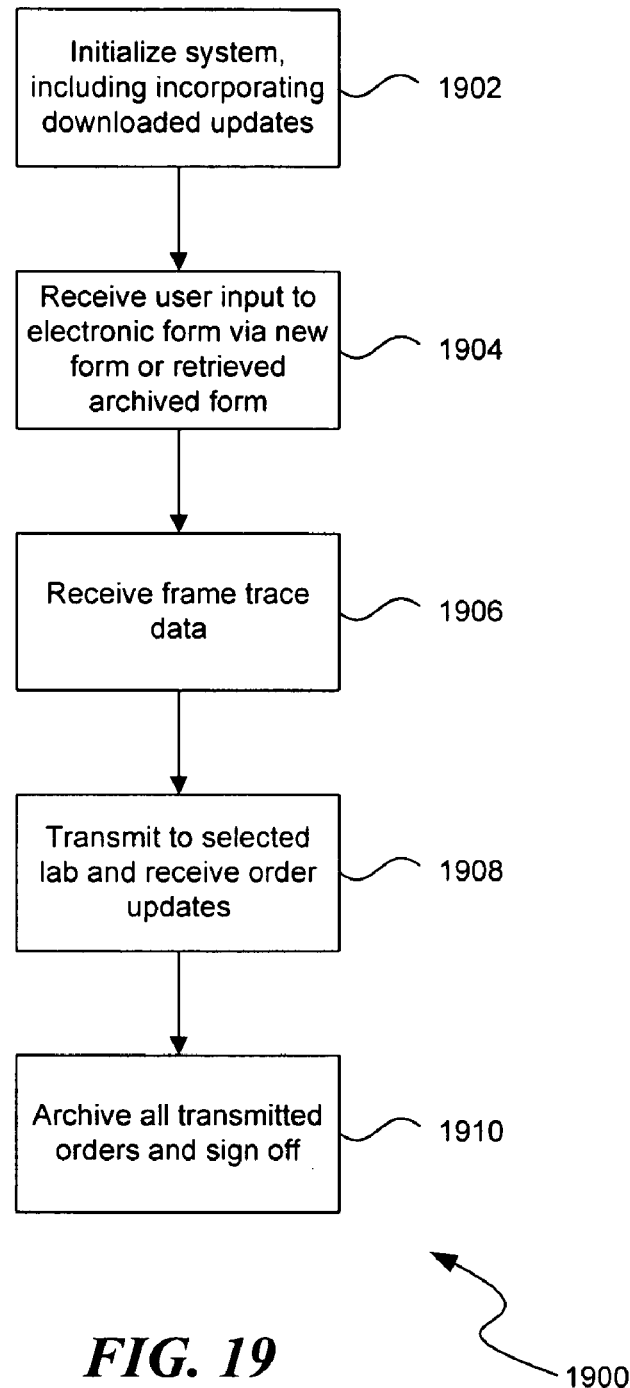
FIG. 19 is a flow diagram illustrating a process for generating an electronic order and transmitting it to a remote computer.

Referring to FIG. 19, an example of process flow under one embodiment of the system described herein will now be provided as a routine 1900. Beginning in block 1902, the operator initializes the electronic order entry process 1900 stored on the user computer 222. During initialization, the user computer 222 accesses via the Internet 226, the lab computers 227 and server computer 208 to receive and store locally any updates (FIG. 2A). For example, one or more labs with which the user computer places orders may have added or removed certain products or offerings. Thus, after receiving such an update, the user computer will no longer show those options to the operator in the form 300 when that lab is selected. Likewise, the server computer 208 may provide any software updates so that the user computer is executing the most current version of the electronic ordering software.

In block 1904, the process 1900 receives user input to the electronic form 300. The electronic form 300 may be a new form that the user selects. Alternatively, the user may select an archived form (such as a form previously completed for the same patient), and edit that form to create a new form.

In block 1906, the process 1900, via the user computer, optionally receives frame trace data. The functionality provided under block 1906 is provided when the operator selects the frame trace button 322 and inputs to the process a frame trace file generated from a frame tracer or digitizer.

In block 1908, the process 1900, via the user computer receives user input that the order is complete and is to be transmitted to the selected lab. Once the lab computer 227 receives the electronic order, it retrieves from its database (not shown) the status of orders pending for the particular account specified in the account field 306. Status information regarding these pending orders is then transmitted back to the user computer 222. The operator may then view status information regarding pending orders by selecting the Order Lookup button 346.

In block 1910, the routine 1900 archives transmitted orders. The user may be prompted with a dialog box that asks the user how long the order is to be archived. Alternatively, the routine 1900 may ask the user when initially set up for a default time period during which transmitted orders are to be archived. The orders may be archived locally at the user computer. Local archiving permits the user computer to rapidly retrieve archived orders requested by the user.

In one embodiment, much of the functionality provided under the routine 1900 is stored locally at the user computer 222. Thus, the user computer 222 has associated therewith a database (not shown) that contains information regarding all of the products and offerings provided by each lab with which the operators of the user computer do business. As explained above, the electronic order entry system only permits the operator to enter valid orders reflecting products and services provided by a selected lab or manufacturer. In this embodiment, completed forms are also stored locally, as well as any downloaded software upgrades or order status information. Under this embodiment, the routine 1900 may be implemented in C++, although it may be implemented in, for example, XML, HTML or web-based programming.

Under an alternative embodiment, much of the functionality provided under the routine 1900 resides at the server computer 228. In this alternative embodiment, the user computer employs a "thin client" and the browser to access the electronic order entry functionality under the routine 1900 at the server computer 228. Under this alternative embodiment, the electronic order form 300 and other screens provided herein may be implemented in HTML or other appropriate display languages or scripts. The server computer 208 receives updates to products and services provided by labs associated with the lab computer 227 and stores such data in the database 230. The database 230 (or other databases described herein) includes linked tables associated with each lab to identify products and services provided by that lab. Such linked tables permit only valid orders to be entered via the series of cascaded menus (or other order entry). A possible drawback to this alternative is that it may require more robust computing and telecommunication resources at the user computer, so that the user computer may has ready access to the server computer 208 via the Internet 226.

Figure 22:
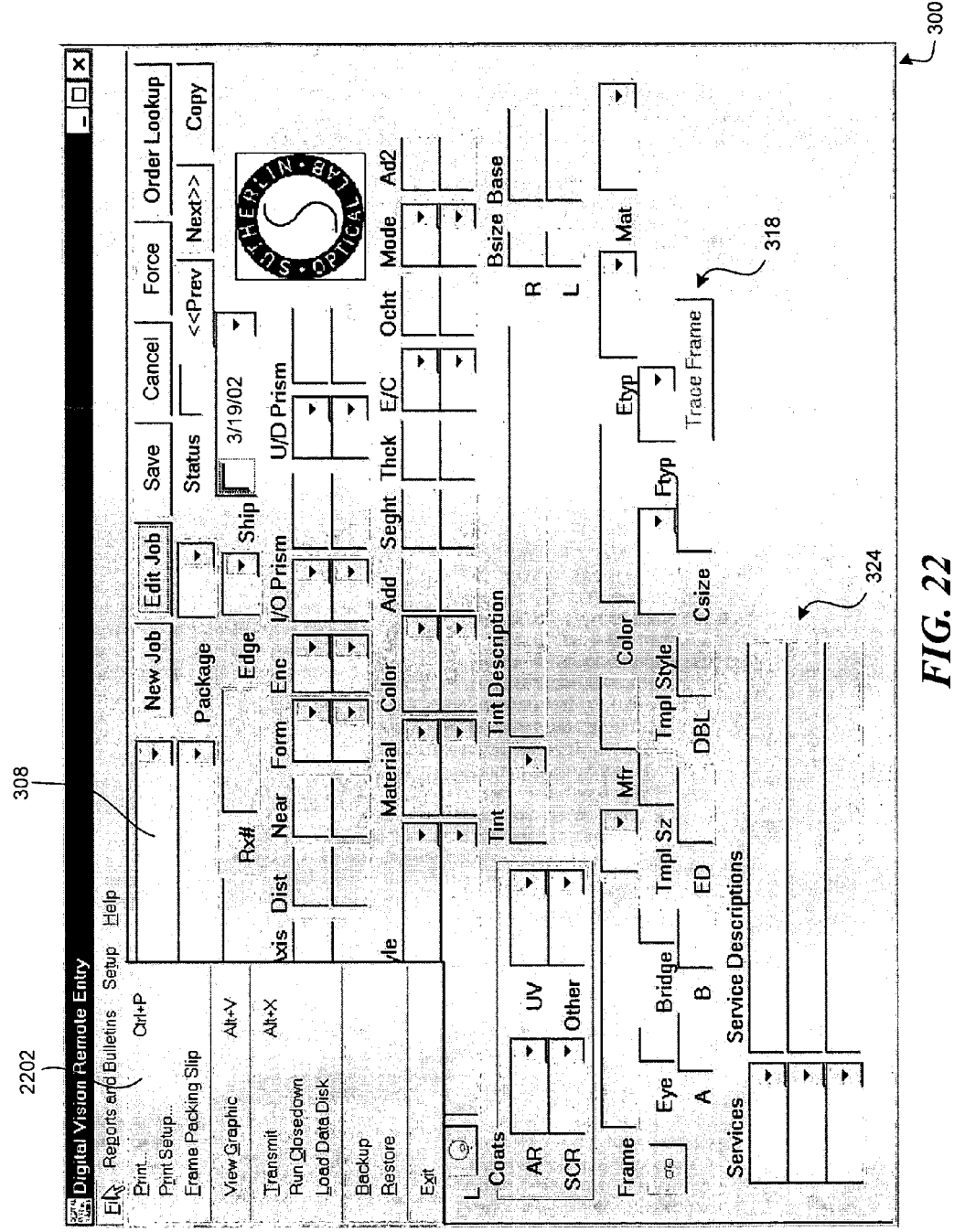
FIG. 22 is a computer screen shot showing a series of menu options from a pull down File menu.

Additional features and functionality of the electronic order placement system will now be described. Referring to FIG. 22, a drop down "File" menu 2202 is shown. In addition to standard functions provided under the Microsoft Windows system, the system provides the following additional functions. The "Print" option allows the system to print a "job ticket." The job ticket is effectively a printed screen shot of the electronic form 300, but with frame shape data included (shown in FIG. 23). The frame shape may be used by some ECPs because it includes lens marking instructions. The user may then use the printed job ticket for record keeping purposes. A "Frame Packing Slip" prints a form, similar to a screen shot of a completed form to wrap around a frame that may be sent later to a lab to whom electronic orders had previously been placed. This allows the lab to readily unite the frame with the order pending in that lab.

Figure 23:
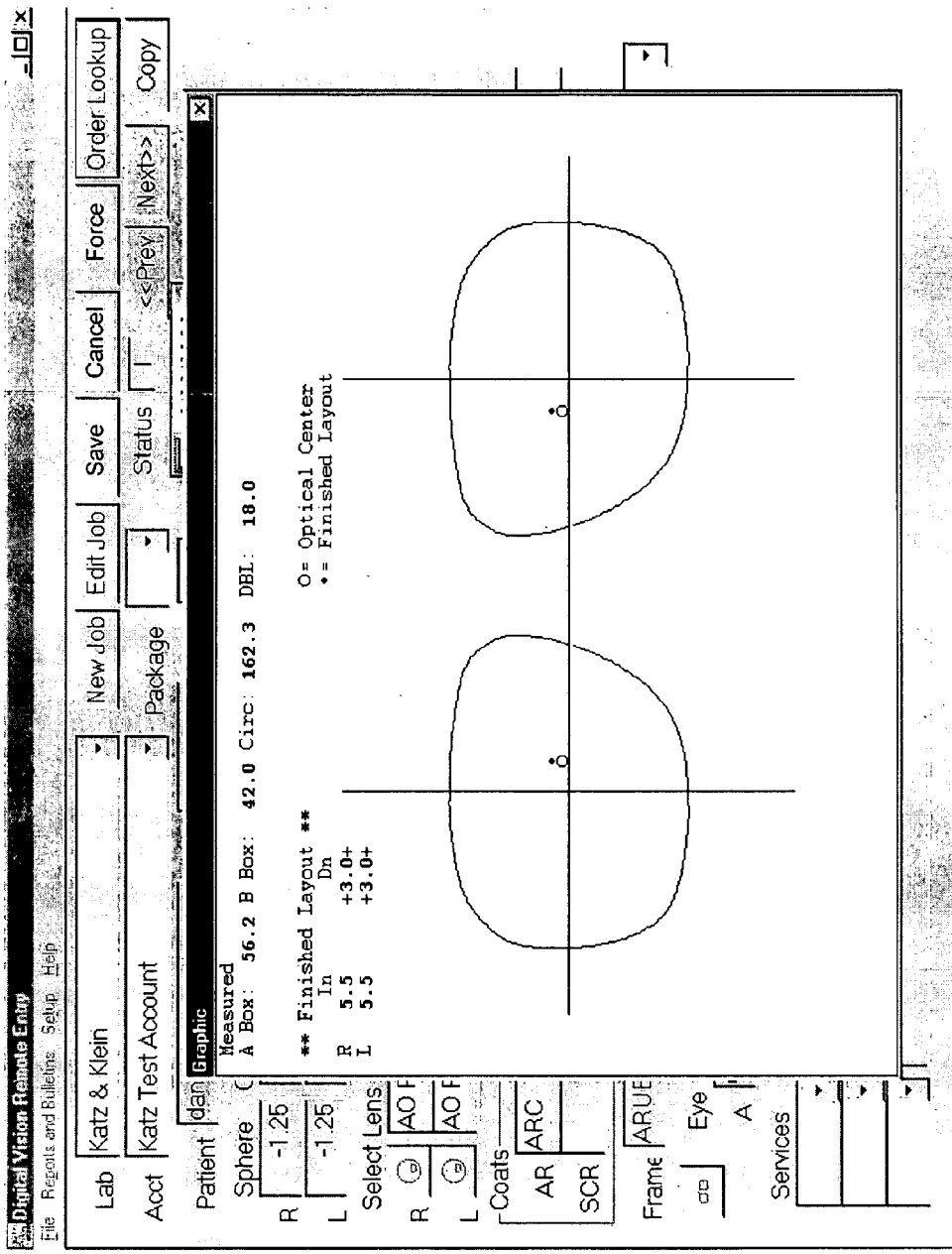
FIG. 23 is a computer screen shot showing a lens graphic.

A "View Graphic" option allows the system to display an actual size graphic of a lens order showing frame shape, distance of the optical center and near point, as shown in FIG. 23. A "Transmit" option allows the user to send unsent electronic orders and retrieve status of orders, bulletins, lab data updates (regarding new and discontinued products), and program updates to the system.

A "Run Close Down" option moves all electronic orders that have been completed (although may not necessarily have been filled by a lab) to a local database for archiving. The system may automatically archive such forms, in addition to this function. A "Load Data Disk" option allows the user to import old or archived orders from disk into the system.

Figure 24:
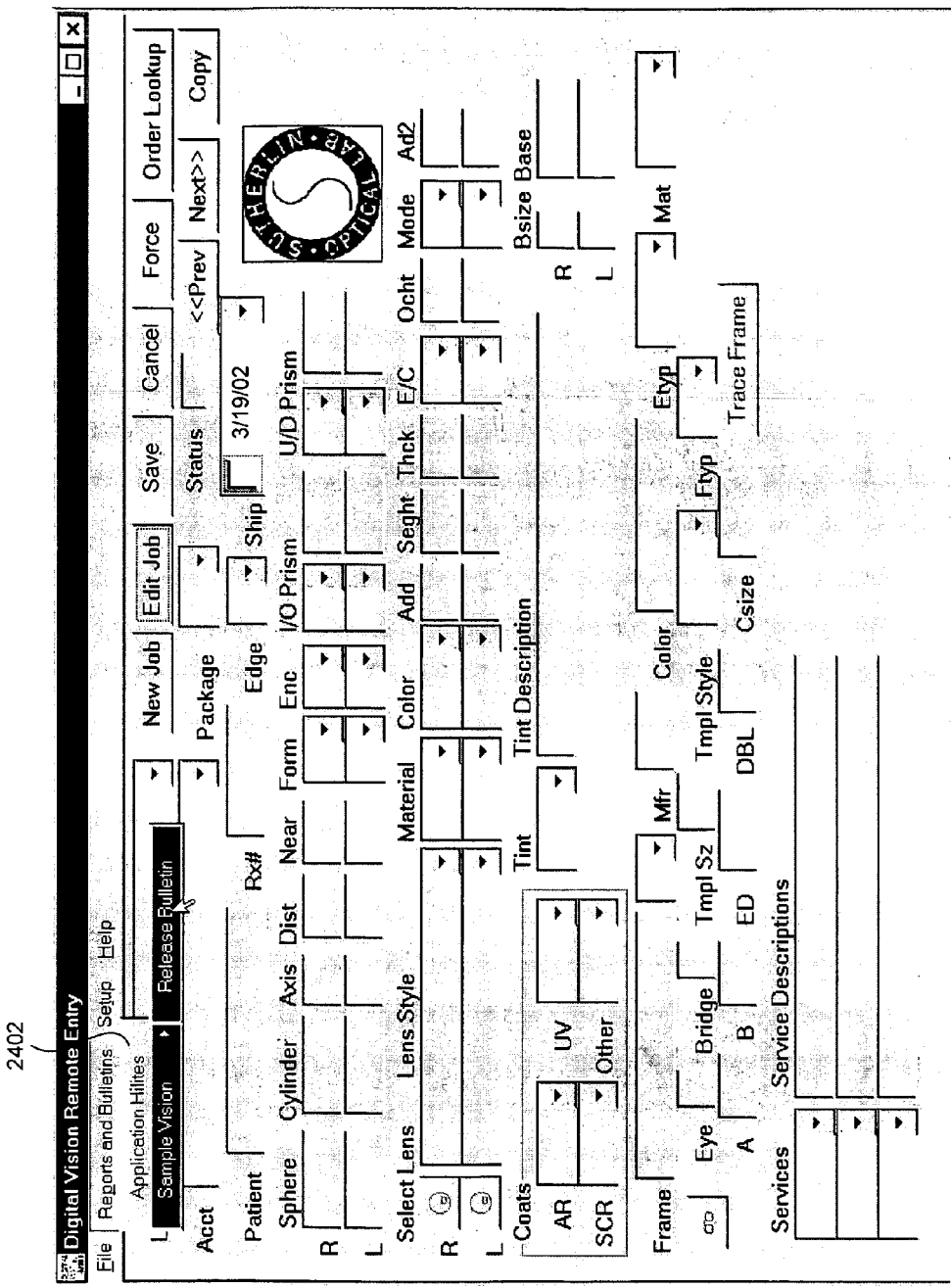
FIG. 24 is a computer screen shot showing a pull down Reports and Bulletins menu.

Referring to FIG. 24, an example of a Reports and Bulletins drop down menu 2402 is shown. An Application Hilites option allows the user to display highlights regarding recent updates or releases to system software. The lab can also provide marketing and promotional information in the form of a bulletin. FIG. 24 shows from the pull down menu an example of a lab, "Sample Vision" having provided a customized bulletin to its customers. Thus, the Application Hilites function allows the third party and server computer 208 to provide communications or posts for the user, while the lab bulletin function allows a lab to do similar notifications or posts via the lab computer.

Figure 25:
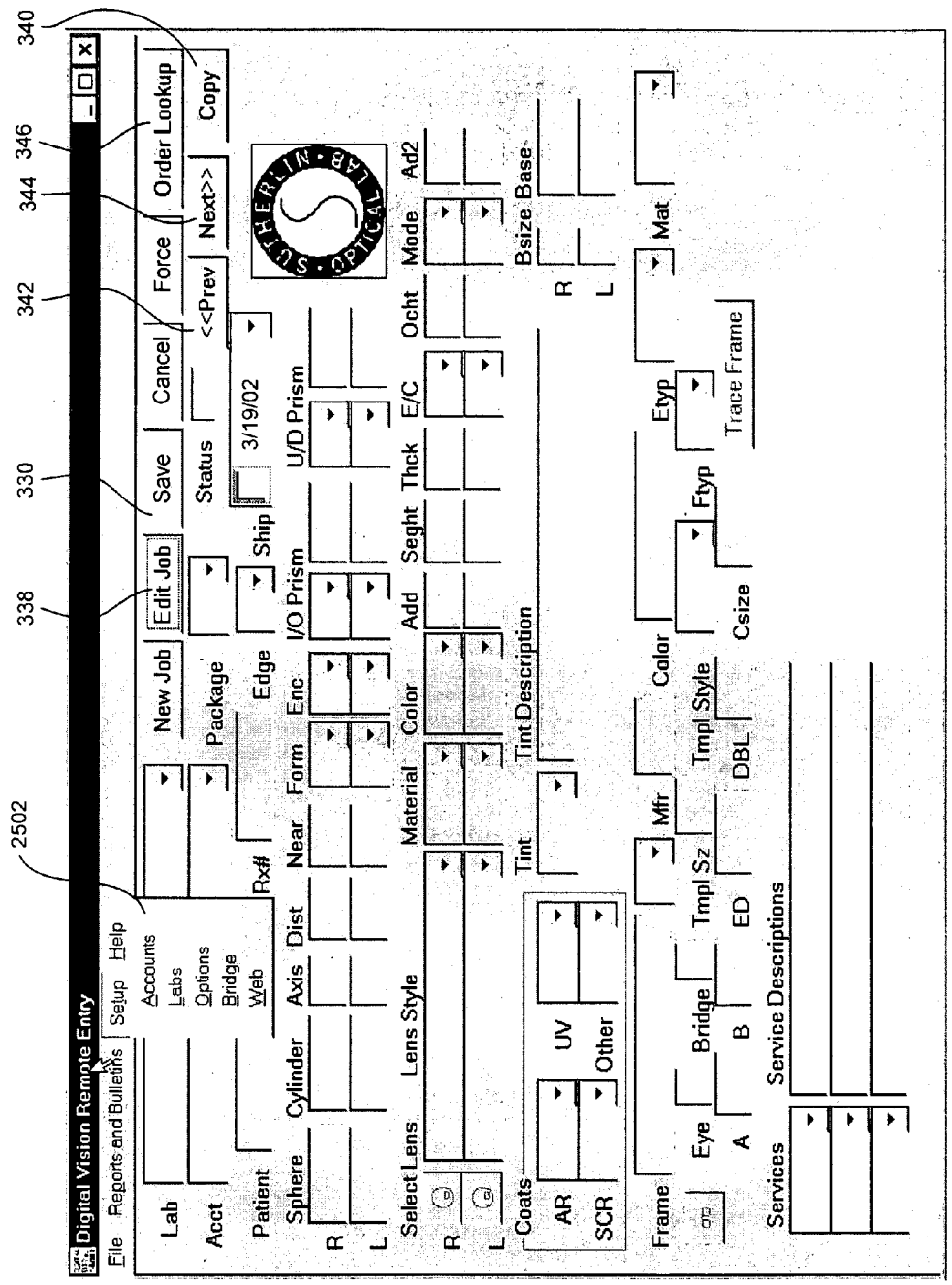
FIG. 25 is a computer screen shot showing a pull down Setup menu.

Referring to FIG. 25, an example of a Setup pull down menu 2502 is shown. By selecting an "Accounts" option in the Setup menu 2502, the system displays an account maintenance screen, such as that shown in FIG. 26. As shown in FIG. 26, a screen 2602 displays one or more individuals or accounts that may use the system. As noted above, one office may employ the system, with several operators at that office retaining separate accounts on the system. The screen 2602 allows a user to set a default, as well as add, modify and delete account users-of the system.

Referring to FIG. 27, if a user selects a "Labs" option in the Setup menu 2502, the system displays a lab maintenance screen 2702. As shown in the lab maintenance screen 2702, several labs to whom the user may transmit electronic orders are shown. Using buttons at a bottom of the screen 2702, the user may set a default, as well as add, modify and delete labs listed in the screen. A "Member Accts" button displays accounts defined on the customer's computer and allows them to make various accounts a member of the selected lab.

Figure 28:
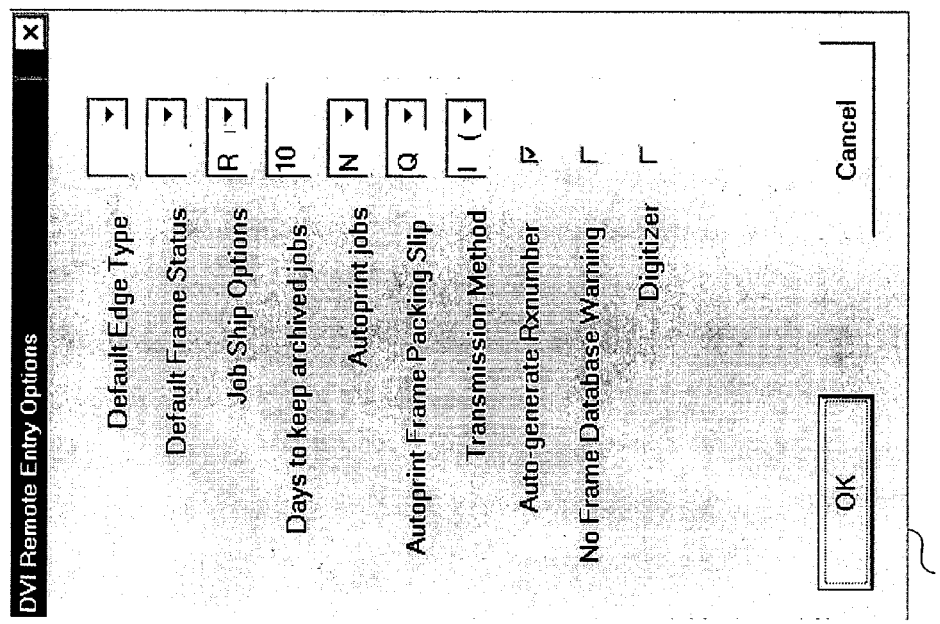
FIG. 28 is a computer screen shot of a remote entry options screen.

Referring to FIG. 28, it the user selects a "Options" option in the Setup menu 2502, the system displays a remote entry options screen 2802. The remote entry options screen 2802 allows the user to set the following default values: a default edge type, a default frame status, a job ship option, number of days to keep jobs archived in the database, whether jobs are to be automatically printed when transmitted to a lab, whether a frame packing slip is to be automatically printed, a transmission method (e.g., modem or via the Internet), whether to automatically generate incrementing prescription numbers in the Rx # field with each new order, a no frame database warning, and whether a frame digitizer is employed with the system. The default frame status allows the ECP to assign a frame status (N—frame-to-follow, S—lab supply, E—enclosed, or L—lenses only) automatically to each job entered in the frame status field noted above. The job shipped options are:

S—automatically mark that an electronic order has been shipped when the completed electronic order form 300 is sent to the lab, and then archive the form (or flag for archiving), R—mark that an electronic order has been shipped only when the completed electronic order form 300 is sent to the lab, the lab acknowledges that the order was received, and the ECP provides input to the system of this (and then archive the form (or flag for archiving)), M—mark that an electronic order has been shipped only when the ECP provides input to the system of this (and then archive the form (or flag for archiving)), D—automatically mark that an electronic order has been shipped when the system receives an order update from the lab indicating that the order was shipped (and then archive the form (or flag for archiving)).

The autoprinting of the fame packing slip can be set to "Y" which will print a frame packing slip for each electronic order or job, "N" which will suppress the printing of the fame packing slip for each order, or "Q" which causes the system to ask about such printing with each order. The "no frame database warning" option allows the user to turn off and on a data entry warning that comes up if the user specifies a frame combination that is not in the lab's frame database.

If the user selects a "Bridge" or "Web" option under the Setup menu 2502, the system displays to the user one or more screens to permit the user to setup parameters associated with modem or Internet communications under the system, respectively.

Figure 30:
FIG. 30 is a computer screen shot of an example of an order record selected from the screen of FIG. 29.
Figure 31:
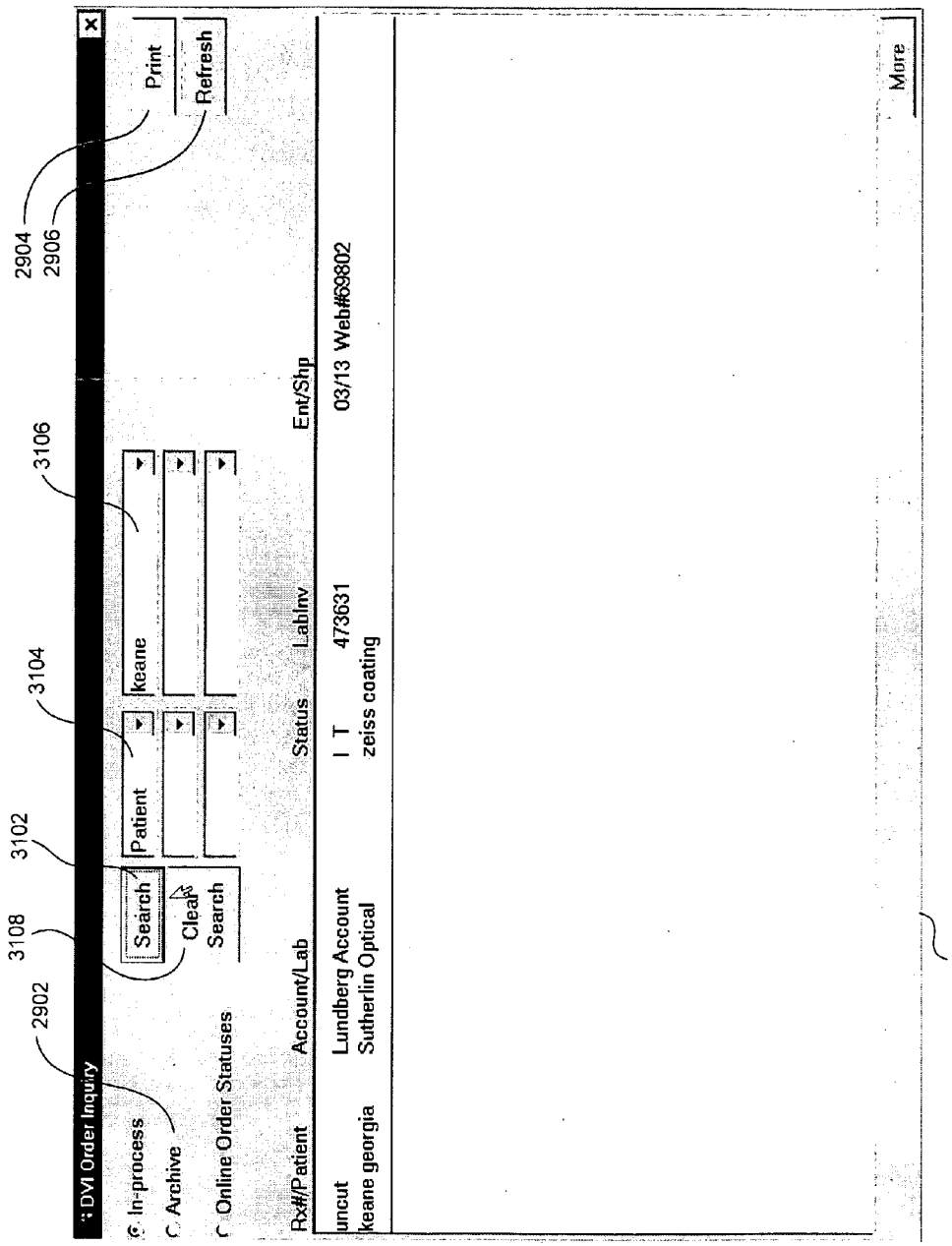
FIG. 31 is a computer screen shot of an order inquiry search screen.

Referring to FIGS. 29–31, order lookup functions will now be described when the user selects the order lookup button 346. Referring to FIG. 29, an example of an order inquiry screen 2902 is shown. The screen includes order choice radio buttons 2902 that allow the user to select between in process orders, archived orders, or view on-line order statuses from labs. By selecting one of these buttons, the system performs an inquiry of the order database and retrieves the records appropriate to the button selected. The user may then click a print button 2904 to print the retrieved database query. The user may also click a refresh button 2906 to refresh the screen if changes have been made. As shown, each record is listed with the following data fields: a prescription number and patient, account and lab, status, lab invoice, and a job entered or ship date, with a number associated with the order record. In an alternative embodiment, a user may click a heading for a column associated with any of the data fields to have the system sort retrieved records for display in the screen 2902.

In the example of FIG. 29, the user has selected a second order listed, and by so selecting, the system displays that particular record, which is shown as a screen 3002 in FIG. 30. The user may then edit or copy that record by selecting buttons 338 or 340, or view previous or next records by selecting buttons 342 or 344.

Referring to FIG. 31, the user may do a focused search of stored order records by using a search button 3102, field name fields 3104 and field entry fields 3106. As shown, the user may enter up to three field names in the field name fields 3104 (such as "patient," "Lab," or other fields in the form 300), as well as enter data associated with that field in the field entry fields 3106. A clear search button 3108 allows the user to clear a search. As shown in the example of FIG. 31, the user requested the system to provide any in process orders where the patient's name is "keane," which shows a single entry retrieved.

The computer could periodically (e.g., every 15 minutes or once a day) access the lab computer 227 to determine the status of various pending orders, and update the screen shown in FIG. 29. Furthermore, in an alternative embodiment, a patient or user could access order status so that he or she could check on the status electronically, rather than having it call his or her ECP to get this information.

Figure 32:
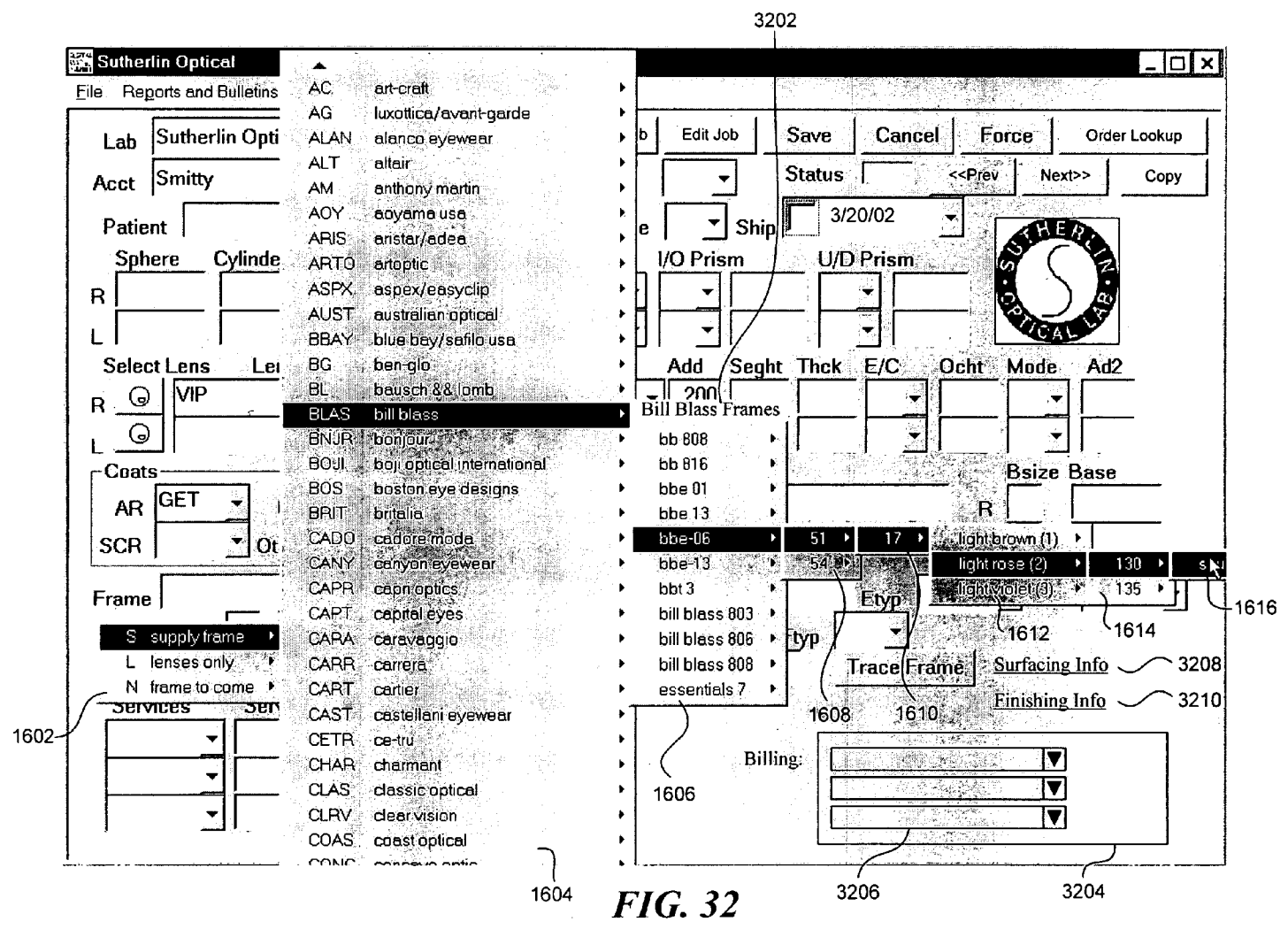

Referring to FIG. 32, several alternatives to that described above will be described with respect to a screen similar to that shown in FIG. 17A. As shown, when a user accesses the vendor's product menu 1606, a first option in the menu is a URL or vendor link 3202, which in this case is a URL to a Bill Blass website showing and describing various frames manufactured by Bill Blass. Thus, while the link 3202 shows "Bill Blass Frames," the resolved link may be, for example, http://www.BillBlass.com/frames. By using the link 3202, the operator may access one or more web pages provided by the manufacturer to view information in images of frames displayed in the vendor product menu 1606.

Likewise, while not shown, lens manufacturers may similarly provide links to their web sites or other information within the lens manufacturer menu 404. Alternatively, or additionally, lens manufacturers, frame manufacturers, or other vendors of materials and services provided under the order entry screens shown herein may provide pop-up ads. Such pop-up ads may be in separate windows displayed over a currently displayed window. Such ads may provide additional information regarding current products, new products, or special offers being made. For example, a lens coating manufacturer may be offering a special to certain labs. The lab then may provide for a pop-up window advertisement for such a promotion to operators using the system described herein. Furthermore, each package provided under the package field 1002 may include a link to a page, file or other displayable information to allow the operator to get additional information regarding each package and its offerings, benefits and limitations.

Under another alternative embodiment, shown in FIG. 32, a billing portion 3204 allows the operator to insert one or more billing entities with respect to a given order. As shown, three billing entity fields 3206 are provided, with drop-down menus to allow the operator to select, for example, the patient, or one or more health care or optical service insurers. Other options are certainly possible to permit the operator to insert additional information regarding billing, such as addresses, special billing instructions, etc.

Under another alternative embodiment, the electronic form includes information with respect to optical equipment manufacturers. For example, a Surfacing Info link 3208 provides a link to one or more surfacing equipment manufacturers, such as manufacturers for grinding, blocking and inspecting lenses, while a Finishing Info link 3210 provides one or more links to web sites providing information on equipment for finishing lenses, such as edgers, tracers and blockers. In a like manner, the frame trace button 322 may include links to frame trace equipment manufacturers so that the operator may obtain information regarding various frame tracing devices.

The system provided herein may integrate with surfacing and finishing equipment. The form 300 may include a button (not shown) similar to the frame trace button 322, that the operator may select to view and import from surfacing/finishing equipment information to be included with an order. Thus, additional fields may be provided to accept information on lens finishing so that such information may be provided directly and electronically to such lens finishing equipment to further automate the lens processing process. Further, this would prohibit the operator from requesting lens processing options that are unavailable for certain lenses, frames, etc.

Under another alternative embodiment, the system provides for an editing engine or XML tool to permit an operator to enter an order under any system, and export it using the system described above. Such an editing engine would receive a file from any order entry system, format it for compatibility with the system described above, and provide any necessary feedback. For example, the order may have been entered with a numeric value outside of a required range. Alternatively, the order could request a product that is simply unavailable by a particular lab or manufacturer. Thus, the tool provides feedback to the operator to ensure that a final order output by the tool may be sent to the lab without requiring a call back from the lab to clarify or correct an entry.

One skilled in the relevant art will appreciate that the concepts of the invention can be used in various environments other than the Internet. For example, the concepts can be used in an electronic mail environment in which electronic mail forms and messages perform the order entry system. In general, a display description may be in XML format, email format or any other format suitable for displaying information (including character/code-based formats, algorithm-based formats (e.g., vector generated), and bitmapped formats). Also, various communication channels may be used, such as a local area network, wide area network, or a point-to-point dial-up connection instead of the Internet. For example, with a dial-up connection, the user computers 222 may communicate directly with the lab computers 227 in a batch mode, whereby multiple, accumulated orders are sent in a batch to the lab computers, and the lab computers, in turn, drive back a batch of multiple status updates, inventory updates, etc. Alternatively, the service computer 228 may operate as an application service provider (ASP) much of the partiality hosted by the server computer, and then client applications reside on the user and lab computers.

The server system may comprise any combination of hardware or software that can support the above concepts. In particular, a web server may actually include multiple computers. A client system may comprise any combination of hardware and software that interacts with the server system. The client systems may include television-based systems, Internet appliances and various other consumer products through which auctions may be conducted, such as wireless computers (palm-based, wearable, mobile phones, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the order entry system described herein. These and other changes can be made to the invention in light of the detailed description.

The elements and acts of the various embodiments described above can be combined to provide further embodiments. All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A system for ordering lens products from a lens vendor by eye care professionals (ECPs), wherein the system uses a geographically distributed telecommunications network, the system comprising:
    at least one ECP computer; and
    a lens vendor computer wherein the ECP. and lens vendor computers each have a communication facility for exchanging communications with each other over the telecommunications network;
    a lens order entry facility for use by the ECP. and lens vendor computers,
        wherein the lens order entry facility is configured to:

provide a lens order entry screen, including a lens select button and a frame select button;
receive ECP input regarding a particular patient's lens prescription;
provide at least a first lens menu based on the particular patients lens prescription in response to receiving ECP input selecting the lens select button, wherein the first lens menu simultaneously provides a list of lens types;
provide at least a second lens menu in response to receiving ECP input selecting a desired lens type from the first lens menu, wherein the second lens menu simultaneously provides a list of materials available based on the selected lens type;
receive ECP input selecting a desired lens material;
provide at least a first frame menu in response to receiving ECP input selecting the frame select button, wherein the first frame menu simultaneously provides a list of frame vendors;
provide at least a second frame menu in response to receiving ECP input selecting a desired frame vendor from the first frame menu, wherein the second frame menu simultaneously provides a list of frame models available based on the selected frame vendor;
receive ECP input selecting a desired frame model; and
provide to the vendor computer an electronic order, wherein the electronic order includes the lens prescription with the selected lens type and material, and selected frame vendor and model.

2. The system of claim 1, further comprising a frame trace device coupled to the ECP computer, wherein the geographically distributed telecommunications network is the worldwide web, wherein the communication facility includes a web browser, and wherein the lens order entry facility is further configured to:
provide an eyeglass frame trace button;
in response to receiving ECP input selecting the frame trace button, providing at least a frame trace screen for importing a frame trace image from the frame trace device and permitting manipulation of the image; and
append the image file with the electronic order;
wherein the lens order entry facility is configured to:
provide a lab menu list to permit the ECP to select a desired lens lab;
provide a third lens menu in response to receiving ECP input selecting the desired lens type, wherein the third lens menu simultaneously provides a list of lens brands available based on the selected lab and lens type; and
provide a fourth lens menu in response to receiving ECP input selecting the desired lens material, wherein the fourth lens menu simultaneously provides a list of lens colors available based on the selected lab and selected lens type, brand and material.

3. The system of claim 1 wherein the lens order entry facility is further configured to:
provide an order look-up button;
in response to ECP input selecting the order look-up button, provide an order inquiry screen for viewing in-process electronic orders or archived electronic orders;
in response to ECP input selecting to view in-process electronic orders, display at least two in-process electronic orders, each having a prescription number field, a patient field, a lab field, and a status field; and
provide a search order screen to permit the ECP to search at least archived electronic orders by prescription number, patient, lab, or status field.

4. A computer-implemented method for ordering lens products between a user computer and a vendor computer over a geographically distributed telecommunications network, the method comprising:
providing a lens order entry screen, including a lens select option;
receiving a lens prescription input;
providing at least a first lens menu based on the particular patients lens prescription in response to receiving input selecting the lens select option, wherein the first lens menu simultaneously provides a list of lens styles;
providing at least a second lens menu in response to receiving input selecting a desired lens style from the first lens menu, wherein the second lens menu simultaneously provides a list of materials available based on the selected lens style;
receiving input selecting a desired lens material; and
providing an electronic order, wherein the electronic order includes the lens prescription with the selected lens style and material.

5. The method of claim 4, further comprising:
providing at least a first frame menu, wherein the first frame menu simultaneously provides a list of frame brands;
providing at least a second frame menu in response to receiving input selecting a desired frame brand from the first frame menu, wherein the second frame menu simultaneously provides a list of frame models available based on the selected frame brand;
receiving input selecting a desired frame model; and
providing the desired frame brand and model with the electronic order;
providing an eyeglass frame trace option;
in response to receiving input selecting the frame trace option, providing at least a frame trace screen for importing a frame trace image and permitting manipulation of the image;
appending the image file with the electronic order;
providing a lab menu listing two or more lens labs;
providing a third lens menu in response to receiving input selecting the desired lens style, wherein the third lens menu simultaneously provides a list of lens brands available based on a selected lab and lens style; and
providing a fourth lens menu in response to receiving input selecting the desired lens material, wherein the fourth lens menu simultaneously provides a list of lens colors available based on the selected lab and selected lens style, brand and material.

6. The method of claim 4, further comprising:
providing at least a first frame menu, wherein the first frame menu simultaneously provides a list of frame brands;
providing at least a second frame menu in response to receiving input selecting a desired frame brand from the first frame menu, wherein the second frame menu simultaneously provides a list of frame models available based on the selected frame brand;
receiving input selecting a desired frame model; and
providing the desired frame brand and model with the electronic order.

7. The method of claim 4, further comprising:
providing at least a frame menu, wherein the frame menu simultaneously provides a list of frame brands or models;
receiving input selecting a desired frame brand or model; and providing the desired frame brand or model with the electronic order.

8. The method of claim 4, further comprising:
providing an eyeglass frame trace option;
in response to receiving input selecting the frame trace option, providing at least a frame trace screen for importing a frame trace image and permitting manipulation of the image; and
appending the image file with the electronic order.

9. The method of claim 4, further comprising:
appending a frame trace image file with the electronic order.

10. The method of claim 4, further comprising:
providing a lab menu listing two or more lens labs; and
restricting menu options based on input selecting one of the two or more labs from the lab menu.

11. The method of claim 4, further comprising:
providing a third lens menu in response to receiving input selecting the desired lens style, wherein the third lens menu simultaneously provides a list of lens brands available based on the selected lens style; and
providing a fourth lens menu in response to receiving input selecting the desired lens material, wherein the fourth lens menu simultaneously provides a list of lens colors available based on the selected lens style, brand and material.

12. The method of claim 4, further comprising:
providing a third lens menu in response to receiving input selecting the desired lens style, wherein the third lens menu simultaneously provides a list of lens brands or lens colors available based on the selected lens style.

13. The method of claim 4, further comprising:
providing an order look-up option;
in response to input selecting the order look-up button, providing an order inquiry screen for viewing in-process electronic orders or archived electronic orders;
in response to input to view in-process electronic orders, displaying at least one in-process electronic order having a prescription number or patient field and a status field; and
providing a search order screen to permit the to search at least archived electronic orders by prescription number, patient, or status field.

14. The method of claim 4, further comprising:
providing an order inquiry screen for viewing pending electronic orders having a prescription number or patient field and a status field.

15. The method of claim 4, further comprising:
providing a search order screen to permit searching of at least archived electronic orders by prescription number, patient, or status field.

16. The method of claim 4, further comprising:
receiving and validating at least the electronic order at a server computer; and
providing the electronic order to the vendor computer if the electronic order is valid.

17. The method of claim 4, further comprising:
providing at least one lens coatings menu, wherein the coatings menu simultaneously provides a list of coatings available based on a selected lab or the selected lens type and material.

18. The method of claim 4, further comprising:
providing at least one eyewear package menu, wherein the package menu simultaneously provides a list of eyewear package available, and
wherein lens styles and materials provided under the first and second menus are restricted based on a selected package.

19. The method of claim 4, further comprising:
storing the electronic order; and
retrieving and editing the stored electronic order.

20. The method of claim 4, further comprising:
receiving input selecting an eyewear package, and
verifying compatibility of at least the selected lens style and material based on the selected package.

21. The method of claim 4, further comprising:
providing at least a frame option with the electronic order, wherein the frame options include requesting the vendor to supply a frame, to supply lens only, or to indicate that a frame will be sent to the vendor.

22. The method of claim 4, further comprising:
providing printing output for creating a printed screen shot of the electronic order.

23. The method of claim 4, further comprising:
providing links to information for two or more vendors associated with lens provided under the first menu.

24. The method of claim 4, further comprising:
providing a pop up window having information associated with a vendor of products provided under the first or second menu.

25. The method of claim 4, further comprising:
providing billing entry fields for receiving input regarding two or more entities to be billed.

26. The method of claim 4, further comprising:
receiving electronic input associated with lens finishing or surfacing equipment, and
including the lens equipment input with the electronic order.

27. The method of claim 4, further comprising:
receiving an electronic order from another system;
analyzing the electronic order from another system and providing an error report, and
receiving editing input to correct errors in the electronic order from another system.

* * * * *

UNITED STATES PATENT AND TRADEMARK OFFICE
CERTIFICATE OF CORRECTION

PATENT NO. : 7,188,082 B2  Page 1 of 1
APPLICATION NO. : 10/483113
DATED : March 6, 2007
INVENTOR(S) : Keane et al.

It is certified that error appears in the above-identified patent and that said Letters Patent is hereby corrected as shown below:

Column 2
Line 64 "method's" should be --methods--;

Column 3
Line 13 "suitable computer four" should be --suitable computer for--;

Column 11
Line 29, "Dint Description" should be --Tint Description--;

Signed and Sealed this

Seventh Day of August, 2007

JON W. DUDAS
*Director of the United States Patent and Trademark Office*